(12) United States Patent
Murao et al.

(10) Patent No.: US 9,784,982 B2
(45) Date of Patent: Oct. 10, 2017

(54) STEREOSCOPIC DISPLAY DEVICE

(71) Applicant: Sharp Kabushiki Kaisha, Osaka-shi, Osaka (JP)

(72) Inventors: Takehiro Murao, Osaka (JP); Ryoh Kikuchi, Osaka (JP); Takuto Yoshino, Osaka (JP); Hiroshi Fukushima, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/026,301

(22) PCT Filed: Aug. 20, 2014

(86) PCT No.: PCT/JP2014/071777
§ 371 (c)(1),
(2) Date: Mar. 31, 2016

(87) PCT Pub. No.: WO2015/049929
PCT Pub. Date: Apr. 9, 2015

(65) Prior Publication Data
US 2016/0223827 A1    Aug. 4, 2016

(30) Foreign Application Priority Data

Oct. 1, 2013   (JP) ................................ 2013-206650

(51) Int. Cl.
*G02F 1/1335* (2006.01)
*G02B 27/22* (2006.01)
(Continued)

(52) U.S. Cl.
CPC ... *G02B 27/2214* (2013.01); *G02F 1/134309* (2013.01); *H04N 13/0409* (2013.01);
(Continued)

(58) Field of Classification Search
CPC .......... G02B 27/2214; G02F 1/134309; H04N 13/0409
(Continued)

(56) References Cited

U.S. PATENT DOCUMENTS

| 2012/0147281 | A1 | 6/2012 | Matsuhiro et al. |
| 2013/0241922 | A1* | 9/2013 | Kim .................. H04N 13/0409 345/419 |
| 2015/0022750 | A1* | 1/2015 | Ogawa ...................... G02F 1/13 349/43 |

FOREIGN PATENT DOCUMENTS

| JP | 07-287196 A | 10/1995 |
| JP | 08-076139 A | 3/1996 |

(Continued)

OTHER PUBLICATIONS

Official Communication issued in International Patent Application No. PCT/JP2014/071777, dated Oct. 7, 2014.

*Primary Examiner* — Lucy Chien
(74) *Attorney, Agent, or Firm* — Keating & Bennett, LLP

(57) ABSTRACT

A configuration of a stereoscopic display device that is capable of maintaining crosstalk at a low level even when a viewer moves is provided. A stereoscopic display device (1) includes: a display panel (10) for displaying an image; a switch liquid crystal panel (20) that is arranged so as to be stacked on the display panel (10); a position sensor for acquiring position information of a viewer; and a control unit for moving a parallax barrier in which transmitting regions and non-transmitting regions are formed in periodic fashion in a predetermined alignment direction, in such a manner that the parallax barrier is moved in the predetermined alignment direction in accordance with the position information, and causing the switch liquid crystal panel (20) to display the parallax barrier. The switch liquid crystal panel (20) includes: a liquid crystal layer (23) in which
(Continued)

refractive index anisotropy Δn of liquid crystal molecules is 0.14 or less; a first substrate (21) and a second substrate (22) that face each other with the liquid crystal layer (23) being interposed therebetween; and an electrode group including a plurality of electrodes that are formed on at least one of the first substrate (21) and the second substrate (22) and are arranged in the alignment direction.

11 Claims, 20 Drawing Sheets

(51) Int. Cl.
  *H04N 13/04*   (2006.01)
  *G02F 1/1343*  (2006.01)
(52) U.S. Cl.
  CPC ..... *H04N 13/0411* (2013.01); *H04N 13/0468* (2013.01); *H04N 13/0477* (2013.01); *H04N 13/0497* (2013.01); *H04N 2213/001* (2013.01)
(58) Field of Classification Search
  USPC .......................................................... 349/15
  See application file for complete search history.

(56) References Cited

FOREIGN PATENT DOCUMENTS

| | | |
|---|---|---|
| JP | 11-352454 A | 12/1999 |
| JP | 2013-024957 A | 2/2013 |
| WO | 2012/035806 A1 | 3/2012 |

* cited by examiner

Fig. 9
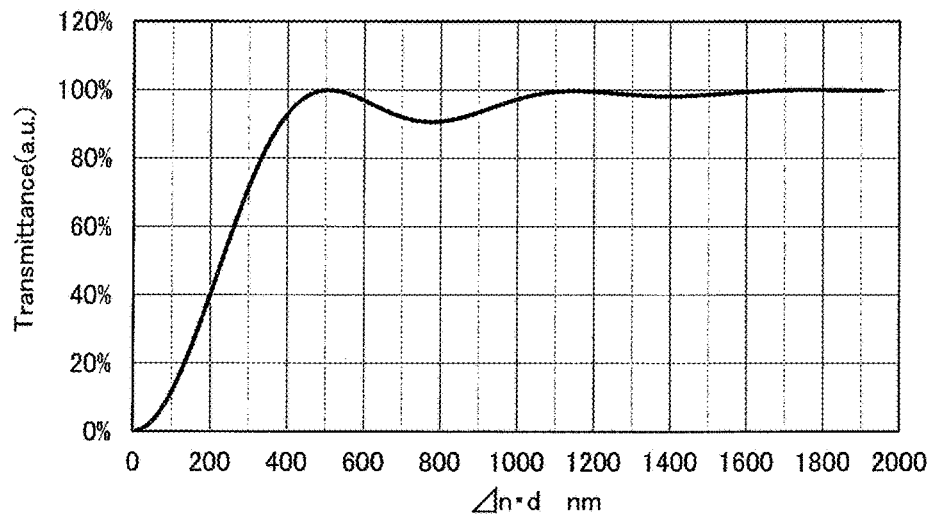
Fig. 10A
|  | 3.0 | 3.5 | 4.0 | 4.5 | 5.0 | 5.5 | 6.0 | 6.5 |
|---|---|---|---|---|---|---|---|---|
| $1^{st}$-min. | 0.170 | 0.146 | 0.128 | 0.113 | 0.102 | 0.093 | 0.085 | 0.078 |
| $2^{nd}$-min. | 0.380 | 0.326 | 0.285 | 0.254 | 0.228 | 0.207 | 0.190 | 0.176 |
Fig. 10B
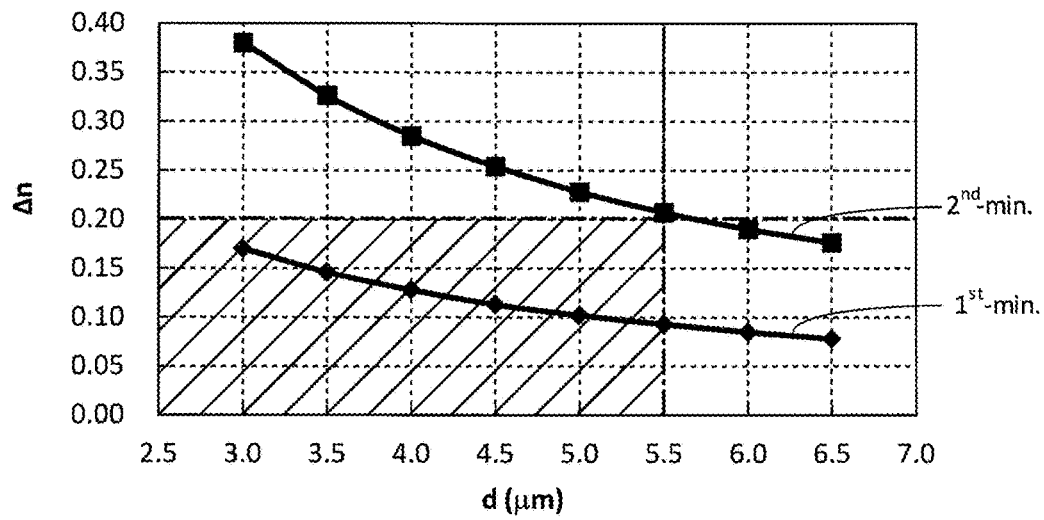

Fig. 24

| Parameters | Cell thickness d(μm) | Refractive index anisotropy Δn | Retardation d·Δn | Crosstalk XT(%) |
|---|---|---|---|---|
| No.1 | 2.9 | 0.175 | 508 | 1.8 |
| No.2 | 3.6 | 0.140 | 504 | 1.5 |
| No.3 | 4.6 | 0.110 | 506 | 1.2 |
| No.4 | 5.5 | 0.092 | 506 | 1.0 |
| No.5 | 6.5 | 0.080 | 507 | 0.8 |

Fig. 26

| Parameters | Cell thickness d(μm) | Refractive index anisotropy Δn | Retardation d·Δn | Crosstalk XT(%) | Followability |
|---|---|---|---|---|---|
| No.1 | 2.9 | 0.175 | 508 | 1.8 | ◎ |
| No.2 | 3.6 | 0.140 | 504 | 1.5 | ◎ |
| No.3 | 4.6 | 0.110 | 506 | 1.2 | ◎ |
| No.4 | 5.5 | 0.092 | 506 | 1.0 | △~○ |
| No.5 | 6.5 | 0.080 | 507 | 0.8 | × |
| No.6 | 4.6 | 0.080 | 368 | 0.8 | ◎ |

Fig. 27

| Parameters | Cell thickness d(μm) | Refractive index anisotropy Δn | Retardation d·Δn | Crosstalk XT(%) |
|---|---|---|---|---|
| No.7 | 2.9 | 0.175 | 508 | 1.8 |
| No.8 | 3.6 | 0.140 | 504 | 1.5 |
| No.9 | 4.6 | 0.110 | 506 | 1.2 |
| No.10 | 5.5 | 0.092 | 506 | 1.0 |
| No.11 | 6.5 | 0.080 | 507 | 0.8 |

STEREOSCOPIC DISPLAY DEVICE

TECHNICAL FIELD

The present invention relates to a naked-eye stereoscopic display device.

BACKGROUND ART

As a stereoscopic display device that can be viewed with naked eyes, those of a parallax barrier type and a lenticular lens type are known. The stereoscopic display devices of these types separate light using barriers or lenses, and cause different images to be visible to the right and left eyes, respectively, so as to provide a stereoscopic vision to the viewer. In recent years, main types of naked-eye stereoscopic display devices that are in the market are those of the two-viewpoint parallax barrier type and those of the lenticular lens type.

In the case of such a two-viewpoint stereoscopic display device, excellent stereoscopic display can be achieved from a predetermined region, but there also exists the following region: when a viewer moves the head to the region, a so-called crosstalk occurs, which is such a phenomenon that an image to be visible to the right eye and an image to be visible to the left eye are mixed and viewed as a double image, or a state of a so-called pseudoscopic vision occurs, which is such a phenomenon that an image to be visible to the right eye is visible to the left eye. Therefore, only from a limited region, a viewer can view stereoscopic images. To address this problem, the multiple-viewpoint technique, the tracking technique of detecting the position of the head of a viewer and displaying an image according to the position and the like have been proposed.

Further, a technique of a switch liquid crystal display (SW-LCD) of a barrier division type has been proposed, wherein a parallax barrier is formed with a liquid crystal panel and is moved according to the position of a viewer. In the case of the SW-LCD technique, if conditions for the parallax barrier formation and the like are not appropriate, changes of luminance and increase of crosstalk occur upon the switching of the parallax barrier, in some cases.

JP2013-24957A discloses a display device that includes: a display panel on which pairs of subpixels are arrayed in a lateral direction; and a parallax barrier shutter panel on which sub-openings whose light transmitting state and light blocking state can be switchable are arrayed in the lateral direction. In this display device, among a plurality of sub-openings corresponding to a reference parallax barrier pitch, an arbitrary number of adjacent sub-openings are turned to be in the light transmitting state, and the other sub-openings are turned to be in the light blocking state, whereby integrated openings obtained are formed in the parallax barrier shutter panel. Then, the sub-opening pitch is equal to or smaller than the difference between the width of the subpixel and the width of the integrated opening.

DISCLOSURE OF THE INVENTION

In order to satisfy the requirements described in JP2013-24957A, it is necessary to decrease the subpixel opening pitch. In order to decrease the subpixel opening pitch, it is necessary to increase the number of electrodes in the parallax barrier shutter panel. The increase of the number of electrodes in the parallax barrier shutter panel, however, is limited, since it causes another problem in some cases.

An object of the present invention is to obtain a configuration of a stereoscopic display device that is capable of maintaining crosstalk at a low level even when a viewer moves.

A stereoscopic display device disclosed herein includes: a display panel for displaying an image; a switch liquid crystal panel that is arranged so as to be stacked on the display panel; a position sensor for acquiring position information of a viewer; and a control unit for moving a parallax barrier in which transmitting regions and non-transmitting regions are formed in periodic fashion in a predetermined alignment direction, in such a manner that the parallax barrier is moved in the predetermined alignment direction in accordance with the position information, and causing the switch liquid crystal panel to display the parallax barrier. The switch liquid crystal panel includes: a liquid crystal layer in which refractive index anisotropy $\Delta n$ of liquid crystal molecules is 0.14 or less; a first substrate and a second substrate that face each other with the liquid crystal layer being interposed therebetween; and an electrode group including a plurality of electrodes that are formed on at least one of the first substrate and the second substrate and are arranged in the alignment direction.

By the present invention, a configuration of a stereoscopic display device that is capable of maintaining crosstalk at a lower level even when a viewer moves is obtained.

BRIEF DESCRIPTION OF DRAWINGS

FIG. 9 is a graph showing the relationship between retardation Δn·d of a liquid crystal layer and transmittance of the liquid crystal layer.

FIG. 10A is a table that shows the relationship between the cell thickness d and the refractive index anisotropy Δn when the retardation Δn·d is set to the $1^{st}$-min. or the $2^{nd}$-min.

FIG. 10B is a table that shows the relationship between the cell thickness d and the refractive index anisotropy Δn when the retardation Δn·d is set to the $1^{st}$-min. or the $2^{nd}$-min.

FIG. 24 is a table illustrating the relationships between parameters and crosstalk XT (%) regarding five types of stereoscopic display devices.

FIG. 26 is a table illustrating the relationships between parameters, crosstalk XT (%), and followability regarding six types of stereoscopic display devices.

FIG. 27 is a table illustrating the relationships between parameters and crosstalk XT (%) regarding five types of stereoscopic display devices.

MODE FOR CARRYING OUT THE INVENTION

Figure 1:
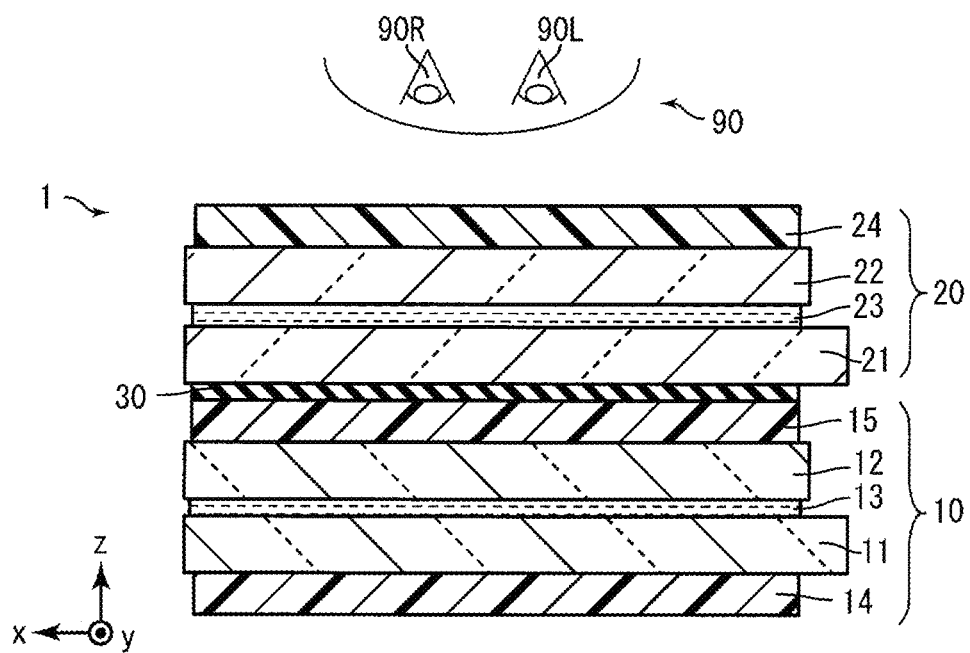
FIG. 1 is a schematic cross-sectional view illustrating a configuration of a stereoscopic display device according to Embodiment 1 of the present invention.

A stereoscopic display device according to one embodiment of the present invention includes: a display panel for displaying an image; a switch liquid crystal panel that is arranged so as to be stacked on the display panel; a position sensor for acquiring position information of a viewer; and a control unit for moving a parallax barrier in which transmitting regions and non-transmitting regions are formed in periodic fashion in a predetermined alignment direction, in such a manner that the parallax barrier is moved in the predetermined alignment direction in accordance with the position information, and causing the switch liquid crystal panel to display the parallax barrier. The switch liquid crystal panel includes: a liquid crystal layer in which refractive index anisotropy Δn of liquid crystal molecules is 0.14 or less; a first substrate and a second substrate that face each other with the liquid crystal layer being interposed therebetween; and an electrode group including a plurality of electrodes that are formed on at least one of the first substrate and the second substrate and are arranged in the alignment direction (the first configuration).

According to the above-described configuration, the switch liquid crystal panel is arranged so as to be stacked on the display panel. On the switch liquid crystal panel, a parallax barrier in which transmitting regions and non-transmitting regions are formed in periodic fashion in a predetermined alignment direction is displayed. This, when a viewer observes the stereoscopic display device at an appropriate position, allows an image on a part of the display panel to be viewed by the right eye, and allows an image on the other part of the display panel to be viewed by the left eye. This allows the viewer to have a stereoscopic vision.

According to the above-described configuration, the control unit causes the parallax barrier to move in the alignment direction according to the position information of the viewer acquired by the position sensor, and causes the switch liquid crystal panel to display the same. This makes it possible to maintain crosstalk at a low level.

Here, as the parallax barrier can be moved more minutely, crosstalk can be maintained at a lower level. The switch liquid crystal panel controls the alignment of liquid crystal molecules of the liquid crystal layer by changing the potentials of the plurality of electrodes included in the electrode group, thereby moving the parallax barrier. It is therefore preferable that the electrode group is composed of as many electrodes as possible.

On the other hand, it is necessary to provide predetermined void spaces between the electrodes, so that the adjacent electrodes should not be short-circuited. When, therefore, the number of electrodes per unit length is increased, the ratio of the areas of void spaces with respect to the areas of the electrodes increases. If the ratio of the void space areas increases, the alignment of liquid crystal molecules in portions of the liquid crystal layer overlapping the void spaces cannot be controlled sufficiently in some cases. This causes a parallax barrier to be formed insufficiently, which results in degradation of crosstalk in some cases.

According to the above-described configuration, the refractive index anisotropy $\Delta n$ of the liquid crystal molecules in the liquid crystal layer is set to 0.14 or less. With this configuration, even if the ratio of the void spaces is large, the influences of the same can be reduced. This makes it possible to maintain crosstalk at a low level.

In the first configuration, it is preferable that the switch liquid crystal panel is normally white (the second configuration).

In the above-described configuration, in the two-dimensional display mode in which the stereoscopic display is not performed, the device is in a state where no voltage is applied, whereby electric power consumption can be reduced.

In the above-described first or second configuration, the retardation of the liquid crystal layer is preferably set to a first minimum (the third configuration).

In any one of the above-described first to third configurations, the liquid crystal layer preferably has a thickness of 5.5 µm or less (the fourth configuration).

In any one of the first to fourth configurations, preferably, when no voltage is applied to the liquid crystal layer, an alignment direction of liquid crystal molecules on a side of the first substrate, and an alignment direction of liquid crystal molecules on a side of the second substrate are different by 90° (the fifth configuration).

The above-described configuration makes it possible to improve the transmittance of the switch liquid crystal panel.

In any one of the first to fifth configurations, preferably the electrode group includes: a first electrode group that includes a plurality of electrodes that are formed on the first substrate and are arranged in the alignment direction at predetermined intervals; and a second electrode group that includes a plurality of electrodes that are formed on the second substrate and are arranged in the alignment direction at the predetermined intervals, and the first electrode group and the second electrode group are arranged so as to be deviated with respect to each other by half of the predetermined intervals in the alignment direction (the sixth configuration).

The above-described configuration makes it possible to move the parallax barrier by using half of the electrode interval as a minimum unit.

In any one of the first to fifth configurations, the electrode group may include: a first electrode group that includes a plurality of electrode that are formed on the first substrate and arranged in the alignment direction at predetermined intervals; and a common electrode that is formed on an approximately entire surface of the second substrate (the seventh configuration).

The configuration according to any one of the first to seventh configurations may be such that the switch liquid crystal panel is arranged on a viewer side with respect to the display panel (the eighth configuration).

According to the above-described configuration, light from the display panel is separated by the switch liquid crystal panel. This configuration is excellent in separation properties, as compared with the ninth configuration described below.

The configuration according to any one of the first to seventh configurations may be such that the display panel is arranged on a viewer side with respect to the switch liquid crystal panel (the ninth configuration).

According to the above-described configuration, light separated by the switch liquid crystal panel passes through the display panel. In this configuration, light separated by the switch liquid crystal panel is scattered or diffracted by the display panel. In this case, crosstalk deteriorates as compared with the configuration in which the switch liquid crystal panel is arranged on a viewer side with respect to the display panel, but the angle-dependent variation of the luminance becomes more gradual.

In any one of the first to ninth configurations, the display panel may be a liquid crystal display panel (the tenth configuration).

EMBODIMENTS

The following describes embodiments of the present invention in detail, while referring to the drawings. In the drawings, identical or equivalent parts in the drawings are denoted by the same reference numerals, and the descriptions of the same are not repeated. To make the explanation easy to understand, in the drawings referred to hereinafter, the configurations are simplified or schematically illustrated, or a part of constituent members are omitted. Further, the dimension ratios of the constituent members illustrated in the drawings do not necessarily indicate the real dimension ratios.

Embodiment 1

Overall Configuration

FIG. 1 is a schematic cross-sectional view illustrating a configuration of a stereoscopic display device 1 according to Embodiment 1 of the present invention. The stereoscopic display device 1 includes a display panel 10, a switch liquid crystal panel 20, and an adhesive resin 30. The display panel 10 and the switch liquid crystal panel 20 are arranged so as to be stacked in such a manner that the switch liquid crystal panel 20 is positioned on the viewer 90 side, and are stuck with each other with the adhesive resin 30.

The display panel 10 includes a TFT (thin film transistor) substrate 11, a CF (color filter) substrate 12, a liquid crystal layer 13, and polarizing plates 14 and 15. The display panel 10 controls TFT substrate 11 and the CF substrate 12 so as to operate the alignment of liquid crystal molecules in the liquid crystal layer 13, thereby to display images.

The switch liquid crystal panel 20 includes a first substrate 21, a second substrate 22, a liquid crystal layer 23, and a polarizing plate 24. The first substrate 21 and the second substrate 22 are arranged so as to be opposed to each other. The liquid crystal layer 23 is interposed between the first substrate 21 and the second substrate 22. The polarizing plate 24 is arranged on the viewer 90 side.

Though FIG. 1 does not illustrate detailed configuration, electrodes are formed on the first substrate 21 and the second substrate 22. The switch liquid crystal panel 20 controls potentials of these electrodes so as to operate the alignment of liquid crystal molecules of the liquid crystal layer 23, thereby to change behavior of light passing through the liquid crystal layer 23. More specifically, the switch liquid crystal panel 23 forms non-transmitting regions (barriers) that block light from the backlight, and transmitting regions (slits) that transmit light from the backlight, by using the alignment of the liquid crystal molecules of the liquid crystal layer 23 and the operations of the polarizing plate 15 and the polarizing plate 24. The configurations and operations of the first substrate 21 and the second substrate 22 are to be described in detail below.

The TFT substrate 11 and the CF substrate 12 have a thickness of, for example, 200 μm. The polarizing plate 14 has a thickness of, for example, 137 μm. The polarizing plate 15 has a thickness of, for example, 170 μm. The first substrate 21 and the second substrate 22 has a thickness of, for example, 225 μm. The thickness of the adhesive resin 30 is, for example, 50 μm.

The polarizing plate 15 may be arranged on the switch liquid crystal panel 20. More specifically, the configuration may be such that the polarizing plate 15 is arranged on a surface on the display panel 10 side of the first substrate 21 of the switch liquid crystal panel 20, and the adhesive resin 30 is arranged between the polarizing plate 15 and the CF substrate 12.

Hereinafter, a direction parallel to a line extending between the left eye 90L and the right eye 90R of the viewer 90 when the viewer 90 and the stereoscopic display device 1 face each other directly (the x direction in FIG. 1) is referred to as a "horizontal direction". Further, the direction orthogonal to the horizontal direction in the surface of the display panel 10 (the y direction in FIG. 1) is referred to as a "vertical direction".

Figure 2:
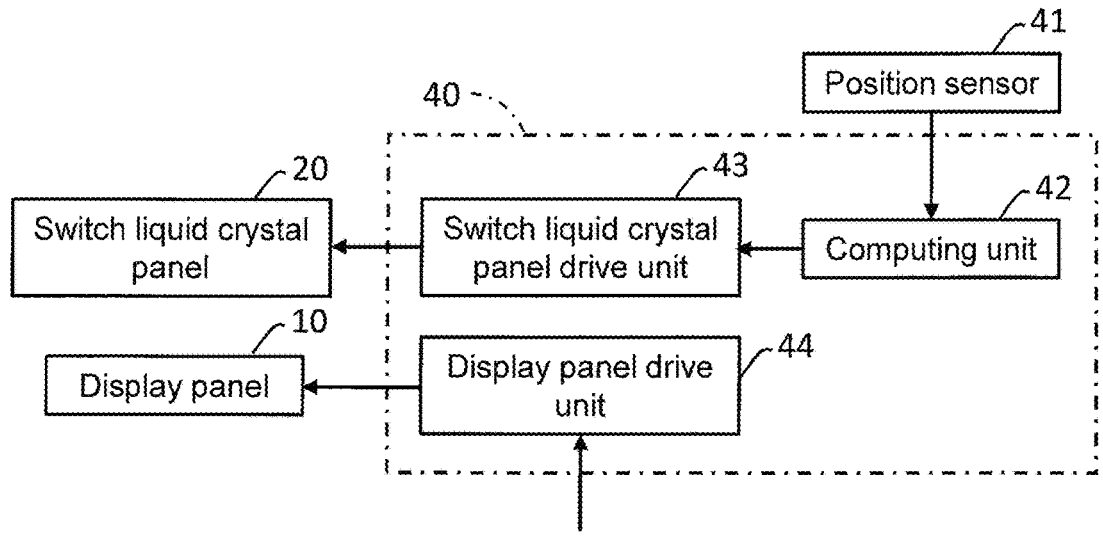
FIG. 2 is a block diagram illustrating a functional configuration of the stereoscopic display device according to Embodiment 1 of the present invention.
Figure 3:
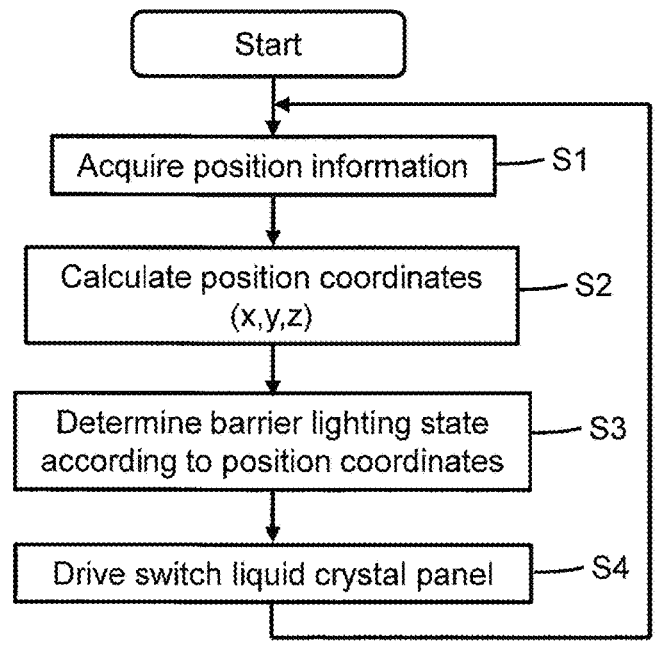
FIG. 3 is a flowchart of a processing by the stereoscopic display device according to Embodiment 1 of the present invention.

FIG. 2 is a block diagram illustrating a functional configuration of the stereoscopic display device 1. FIG. 3 is a flowchart illustrating a processing operation by the stereoscopic display device 1. The stereoscopic display device 1 further includes a control unit 40 and a position sensor 41. The control unit 40 includes a computing unit 42, a switch liquid crystal panel drive unit 43, and a display panel drive unit 44.

The display panel drive unit 44 drives the display panel 10 based on a video signal that is input from outside, and causes the display panel 10 to display an image.

The position sensor 41 acquires position information regarding the position of the viewer 90 (Step S1). The position sensor 41 is, for example, a camera or an infrared light sensor. The position sensor 41 supplies the acquired position information to the computing unit 42 of the control unit 40.

The computing unit 42 analyzes the position information of the viewer 90 supplied from the position sensor 41, and calculates position coordinates (x, y, z) of the viewer 90 (Step S2). The calculation of the position coordinates can be performed by, for example, an eye tracking system for detecting the position of the eyes of the viewer 90 by image processing. Alternatively, the calculation of the position coordinates may be performed by a head tracking system for detecting the position of the head of the viewer 90 with infrared light.

The computing unit 42 further determines a barrier lighting state of the switch liquid crystal panel 20 according to the position coordinates of the viewer 90 (Step S3). More specifically, according to the position coordinates of the viewer 90, the positions of the barriers and the positions of the slits of the switch liquid crystal panel 20 are determined. The computing unit 42 supplies the determined information of the barrier lighting state to the switch liquid crystal panel drive unit 43.

The switch liquid crystal panel drive unit 43 drives the switch liquid crystal panel 20 based on the information supplied from the computing unit 42 (Step S4). Thereafter, Steps S1 to S4 are repeated.

Next, the following description explains principles of the stereoscopic display by the stereoscopic display device 1, using FIGS. 4A to 4C and FIGS. 5A to 5C.

Figure 4A:
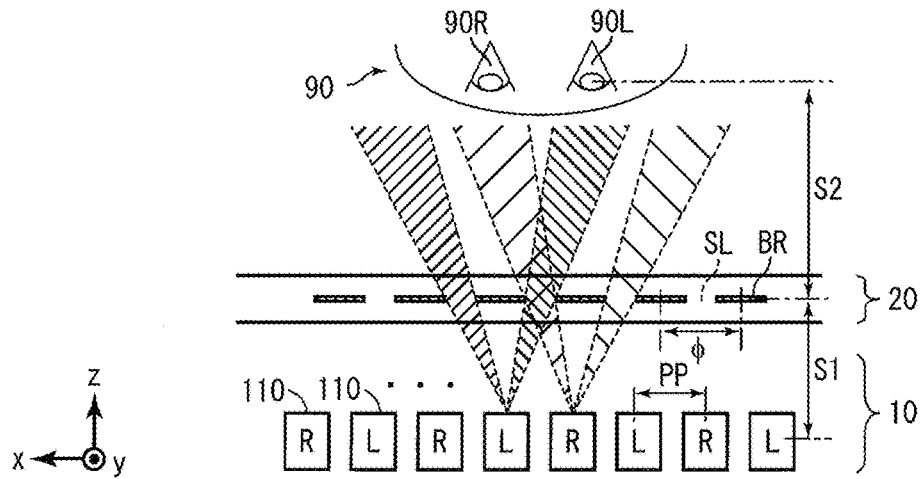
FIG. 4A is a view for explaining principles of the stereoscopic display by the stereoscopic display device according to Embodiment 1 of the present invention.
Figure 4B:
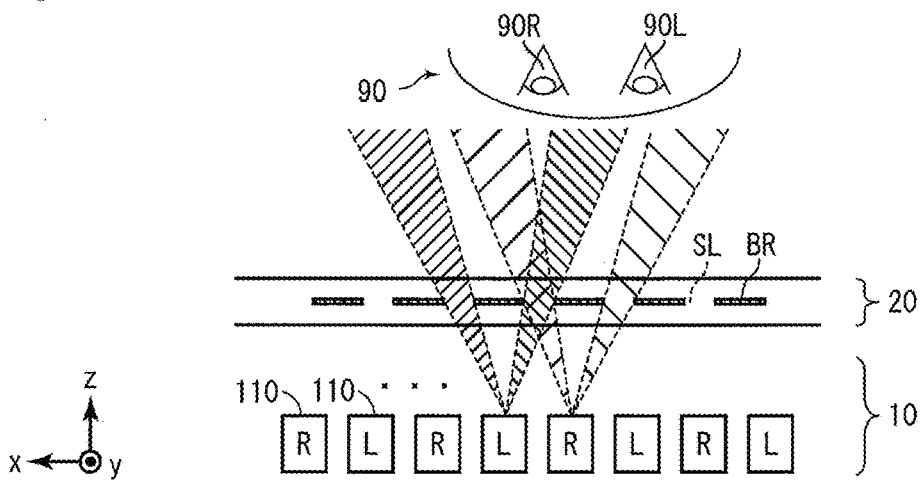
FIG. 4B is a view for explaining principles of the stereoscopic display by the stereoscopic display device according to Embodiment 1 of the present invention.
Figure 4C:
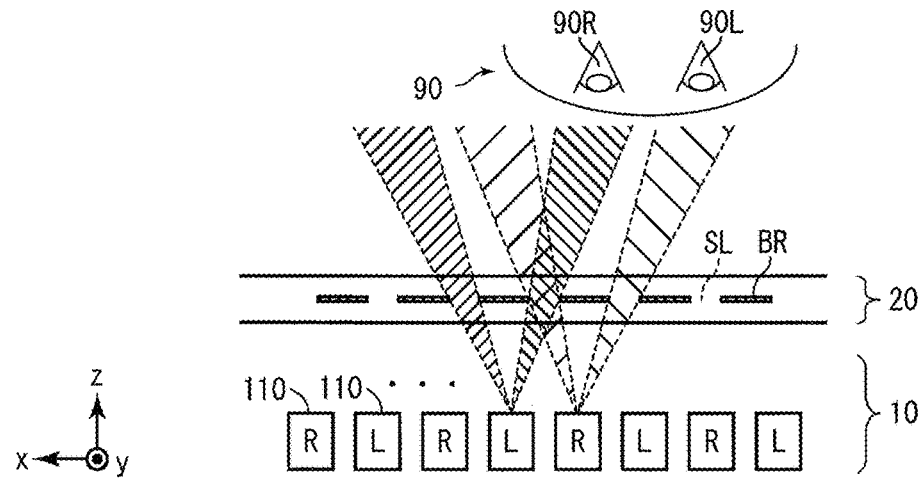
FIG. 4C is a view for explaining principles of the stereoscopic display by the stereoscopic display device according to Embodiment 1 of the present invention.

First of all, a case is explained where the barrier lighting state is fixed, with reference to FIGS. 4A to 4C. The display panel 10 includes a plurality of pixels 110. On the pixels 110, a right-eye image (R) and a left-eye image (L) are alternately displayed in the horizontal direction. In the switch liquid crystal panel 20, barriers BR that block light from the display panel 10 and slits SL that transmit light from the display panel 10 are formed at predetermined intervals. This allows only the right-eye image (R) to be visible to the right eye 90R of the viewer 90, and allows only the left-eye image (L) to be visible to the left eye 90L, as illustrated in FIG. 4A. This allows the viewer 90 to have a stereoscopic vision.

The interval PP of the pixels 110 and the interval φ of the barriers BR satisfy the following expression when S2 is sufficiently greater than S1:

$$\phi \approx 2 \times PP$$

where S1 is a distance from the display surface of the display panel 10 to the barriers BR, and S2 is a distance from the barriers BR to the viewer 90.

FIG. 4B illustrates a state in which the viewer 90 has moved from the position shown in FIG. 4A in the horizontal direction. In this case, to the right eye 90R of the viewer 90, both of the right-eye image (R) and the left-eye image (L) are visible. Similarly, to the left eye 90L, both of the right-eye image (R) and the left-eye image (L) are visible. In other words, crosstalk is occurring, and the viewer 90 cannot have a stereoscopic vision.

FIG. 4C illustrates a state in which the viewer 90 has further moved from the position shown in FIG. 4B in the horizontal direction. In this case, to the right eye 90R of the viewer 90, the left-eye image (L) is visible, and to the left eye 90L thereof, the right-eye image (R) is visible. In this case, the state of pseudoscopic vision occurs wherein a video image that should be recognized as being positioned behind is observed in the foreground, and in contrast, a video image that should be recognized as being positioned in the foreground is observed behind, which makes the viewer 90 unable to have an appropriate stereoscopic vision, and give uncomfortable feeling to him/her.

In this way, as the viewer 90 moves, a normal area where a stereoscopic vision can be obtained, a crosstalk area where crosstalk occurs, and a pseudoscopic area where the state of pseudoscopic vision occurs, appear repeatedly. Therefore, in the case where the barrier lighting state is fixed, the viewer 90 can have a stereoscopic vision only in limited areas.

Figure 5A:
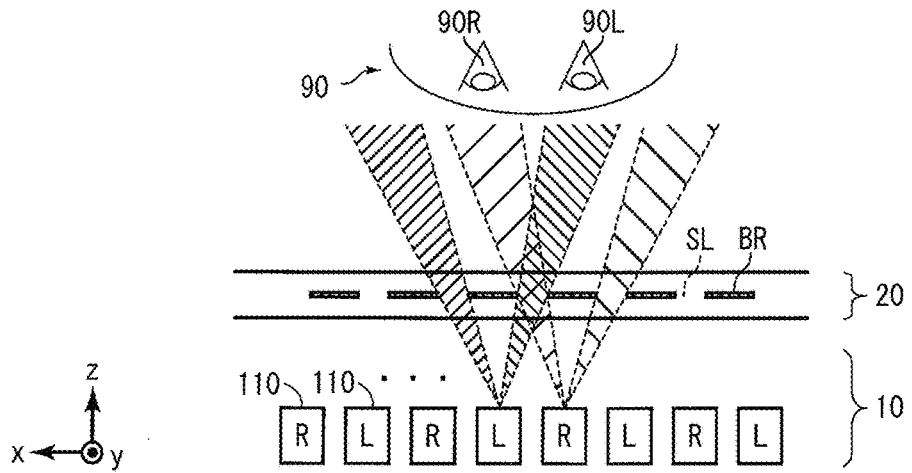
FIG. 5A is a view for explaining principles of the stereoscopic display by the stereoscopic display device according to Embodiment 1 of the present invention.
Figure 5B:
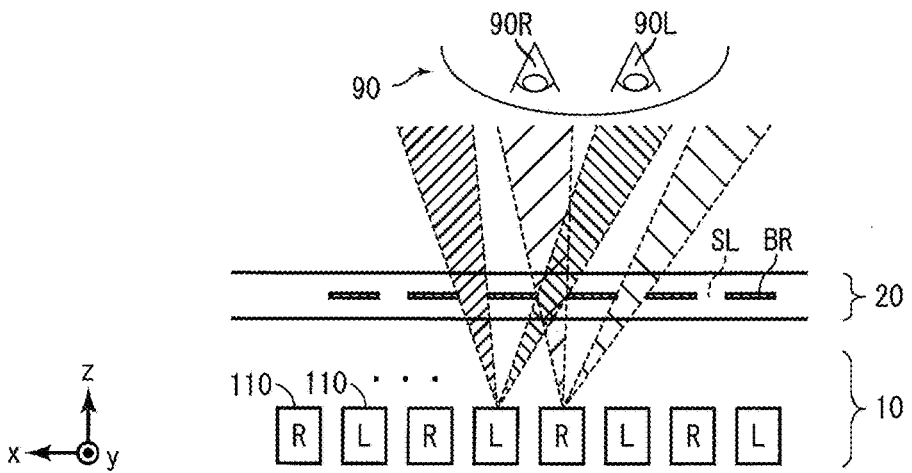
FIG. 5B is a view for explaining principles of the stereoscopic display by the stereoscopic display device according to Embodiment 1 of the present invention.
Figure 5C:
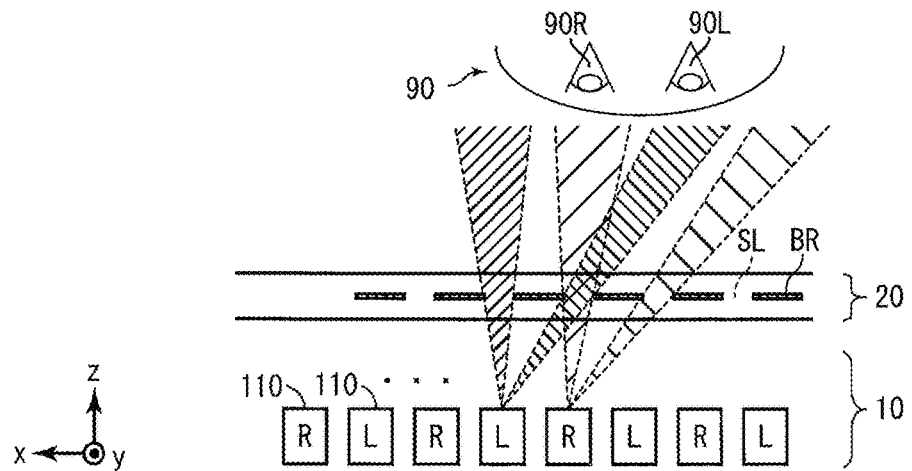
FIG. 5C is a view for explaining principles of the stereoscopic display by the stereoscopic display device according to Embodiment 1 of the present invention.

In the present embodiment, the control unit 40 changes the barrier lighting state of the switch liquid crystal panel 20 according to the position information (position coordinates) of the viewer 90, as illustrated in FIGS. 5A to 5C. This allows the viewer 90 to have a stereoscopic vision always, and prevents crosstalk and the state of pseudoscopic vision from occurring.

[Configuration of Switch Liquid Crystal Panel 20]

Figure 6A:
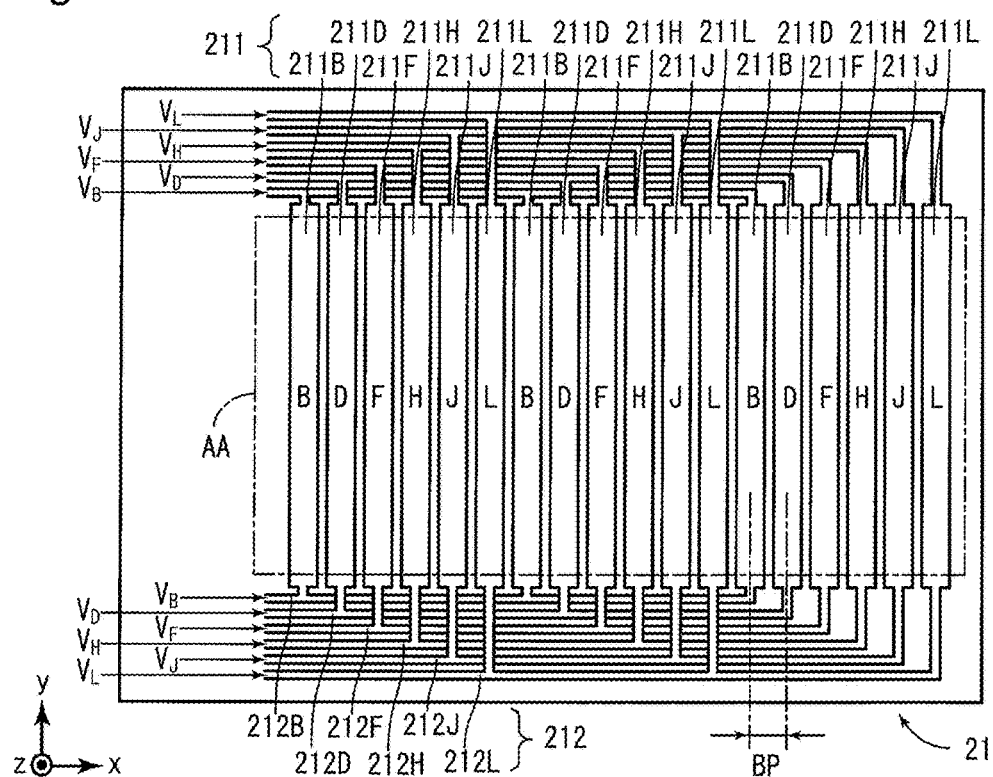
FIG. 6A is a plan view illustrating a configuration of a first substrate of a switch liquid crystal panel.

FIG. 6A is a plan view illustrating a configuration of the first substrate 21 of the switch liquid crystal panel 20. On the first substrate 21, a first electrode group 211 is formed. The first electrode group 211 includes a plurality of electrodes arranged in the x direction at electrode intervals BP. Each of the electrodes extends in the y direction, and they are arranged in parallel with one another.

On the first substrate 21, there is further formed a line group 212 that is electrically connected with the first electrode group 211. The line group 212 is preferably formed outside a region that overlaps a display region of the display panel 10 (an active area AA) when the switch liquid crystal panel 20 is stacked on the display panel 10.

Figure 6B:
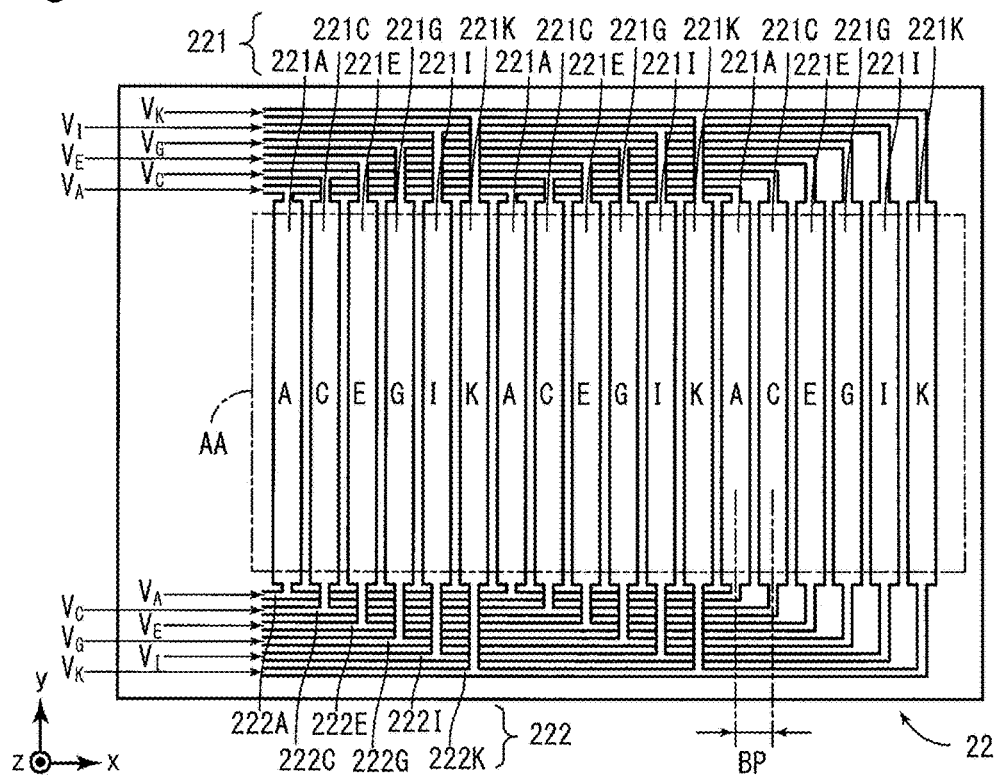
FIG. 6B is a plan view illustrating a configuration of a second substrate of the switch liquid crystal panel.

FIG. 6B is a plan view illustrating a configuration of the second substrate 22 of the switch liquid crystal panel 20. On the second substrate 22, a second electrode group 221 is formed. The second electrode group 221 includes a plurality of electrodes arranged in the x direction at the electrode intervals BP. Each of the electrodes extends in the y direction, and they are arranged in parallel with one another.

On the second substrate 22, there is further formed a line group 222 that is electrically connected with the second electrode group 221. The line group 222 is preferably formed outside the active area AA, as is the case with the line group 212.

To the first electrode group 211 and the second electrode group 221, signals of twelve systems, i.e., signals $V_A$ to $V_L$, are supplied form the control unit 40. More specifically, to the first electrode group 211, signals of six systems, i.e., signals $V_B$, $V_D$, $V_F$, $V_H$, $V_J$, and $V_L$ are supplied via the line group 212. To the second electrode group 221, signals of six systems, i.e., signals $V_A$, $V_C$, $V_E$, $V_G$, $V_I$, and $V_K$ are supplied via the line group 222.

Hereinafter, the electrodes to which the signals $V_B$, $V_D$, $V_F$, $V_H$, $V_J$, and $V_L$ are supplied, among the electrodes of the first electrode group 211, are referred to as electrodes 211B, 211D, 211F, 211H, 211J, and 211L, respectively. Further, lines electrically connected with the electrodes 211B, 211D, 211F, 211H, 211J, and 211L are referred to as lines 212B, 212D, 212F, 212H, 212J, and 212L, respectively.

Regarding the electrodes of the second electrode group 221, similarly, the electrodes to which the signals $V_A$, $V_C$, $V_E$, $V_G$, $V_I$, and $V_K$ are supplied are referred to as electrodes 221A, 221C, 221E, 221G, 221I, and 221K, respectively. Further, the lines electrically connected with the electrodes 221A, 221C, 221E, 221G, 221I, and 221K are referred to as lines 222A, 222C, 222E, 222G, 222I, and 222K, respectively.

The electrodes 211B, 211D, 211F, 211H, 211J, and 211L are arranged in periodic fashion in the x direction in the stated order. In other words, the configuration is such that the same signal should be supplied to a certain electrode, and an electrode that is sixth with respect to the certain electrode. Similarly, the electrodes 221A, 221C, 221E, 221G, 221I, and 221K are arranged in periodic fashion in the x direction in the stated order.

Figure 7:
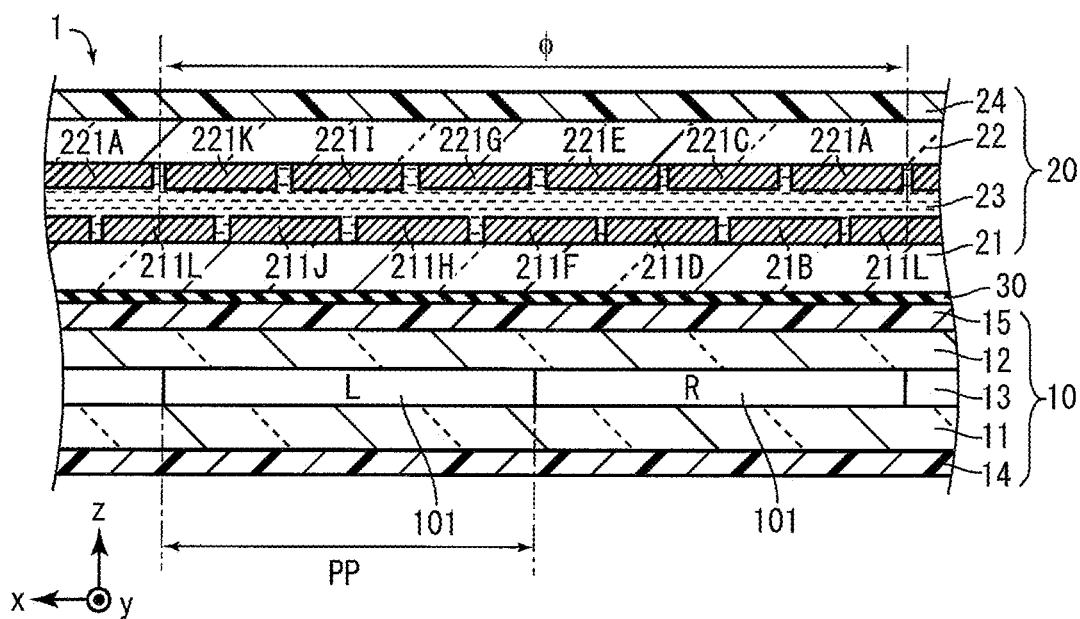
FIG. 7 is a cross-sectional view illustrating a schematic configuration of a stereoscopic display device according to Embodiment 1 of the present invention.
Figure 8:
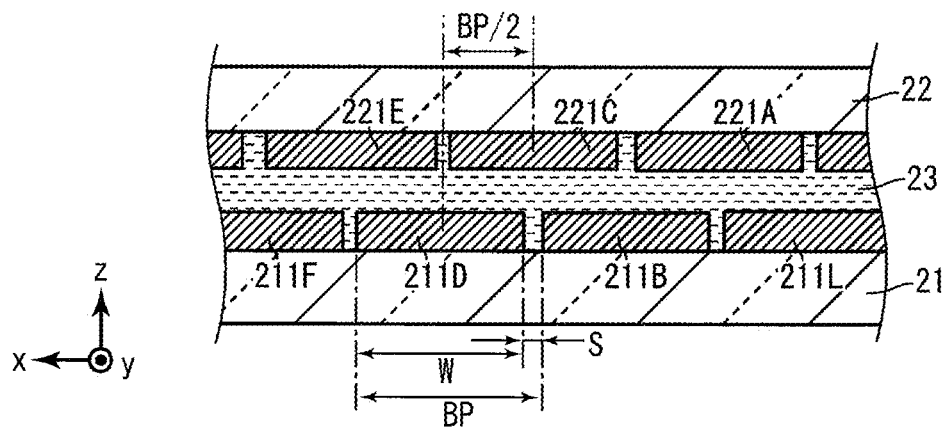
FIG. 8 is an enlarged cross-sectional view illustrating a part of the switch liquid crystal panel.

FIG. 7 is a cross-sectional view illustrating a schematic configuration of the stereoscopic display device 1. FIG. 8 is an enlarged cross-sectional view illustrating a part of the switch liquid crystal panel 20. As illustrated in FIGS. 7 and 8, the first electrode group 211 and the second electrode group 221 are arranged so as to be deviated with respect to each other in the x direction. Preferably, the first electrode group 211 and the second electrode group 221 are arranged so as to be deviated with respect to each other in the x direction by half of the electrode interval BP as in the example illustrated in FIG. 8.

It should be noted that the electrode interval BP is a sum of the width W of the electrode and the clearance S between the electrodes. In the present embodiment, the configuration satisfies BP=φ/6≈PP/3.

Though not shown in FIGS. 7 and 8, alignment films are formed on the first substrate 21 and the second substrate 22. The alignment film formed on the first substrate 21 and the alignment film formed on the second substrate 22 are rubbed in directions that intersect with each other, respectively. This causes the liquid crystal molecules of the liquid crystal layer 23 to be aligned in a state of the so-called twisted nematic alignment, in which the alignment direction rotates from the first substrate 21 toward the second substrate 22 in a no-voltage applied state.

Further, the polarizing plate 15 and the polarizing plate 24 are arranged in such a manner that the light transmission axes thereof are orthogonal to each other. In other words, the liquid crystal of the switch liquid crystal panel 20 according to the present embodiment is so-called normally white liquid crystal, in which the maximum transmittance is obtained when no voltage is applied to the liquid crystal layer 23.

Regarding the configuration of the alignment film, as is the case with the switch liquid crystal panel 20 according to the present embodiment, twisted nematic, which provides high transmittance, is preferably used. Further, regarding the configuration of the polarizing plate, normally white is preferable. The reason for this is as follows: normally white liquid crystal is in a no-voltage-applied state in the two-dimensional display mode, in which stereoscopic display is not performed, which enables to reduce electric power consumption.

FIG. 9 is a graph showing relationship between the retardation Δn·d of the liquid crystal layer 23 and the transmittance of the liquid crystal layer 23. In the case of FIG. 9, the computation is based on the assumption that the twist angle φ of liquid crystal layer 23 is 90° and the wavelength λ of light is 589. If it is assumed that the refractive index anisotropy of the liquid crystal molecule of the liquid crystal layer 23 is Δn, the twist angle is φ, the thickness (cell thickness) of the liquid crystal layer 23 is d, and the wavelength of light is λ, then, when the retardation Δn·d satisfies the following expression, the transmittance is maximized. Here, m is an integer.

$$\Delta n \cdot d = (m^2 - (\phi/\pi)^2)^{1/2} \cdot \lambda$$

The values of the retardation Δn·d with which the transmittance is maximized are referred to as, in the increasing order of the value, the first minimum ($1^{st}$-minimum), the second minimum ($2^{nd}$-minimum), and so on, respectively. More specifically, when the twist angle φ=90° and λ=589 nm are assumed, the following are obtained from the above-described formula: the $1^{st}$-min. is Δn·d=$3^{1/2} \cdot \lambda/2$=510 nm; and $2^{nd}$-min. is $15^{1/2} \cdot \lambda/2$=1141 nm.

FIG. 10A is a table that shows the relationship between the cell thickness d (in the first row) and the refractive index anisotropy Δn (in the second and third rows) when the retardation Δn·d is set to the $1^{st}$-min. or the $2^{nd}$-min. FIG. 10B is a table that shows the relationship between the cell thickness d and the refractive index anisotropy Δn when the retardation Δn·d is set to the $1^{st}$-min. or the $2^{nd}$-min.

The light resistance and reliability of liquid crystal molecules deteriorate when the refractive index anisotropy Δn exceeds 0.2. Besides, when the refractive index anisotropy Δn exceeds 0.2, the transmittance of the liquid crystal itself decreases. The refractive index anisotropy Δn, therefore, is preferably 0.2 or less.

As the cell thickness d increases, the response speed of the switch liquid crystal panel 20 becomes slower, and the followability upon tracking deteriorates. This causes luminance variation and crosstalk to become visible. The cell thickness d therefore is preferably smaller. The cell thickness d is preferably 5.5 μm or less.

As described above, preferably, the refractive index anisotropy Δn is 0.2 or less, and the cell thickness d is 5.5 μm or less. In FIG. 10, this range is schematically illustrated by hatching. As illustrated in FIG. 10, the retardation Δn·d is preferably set to the $1^{st}$-min. in order to satisfy the above-described conditions. More specifically, the retardation Δn·d in the case of the twisted nematic liquid crystal is preferably 330 to 650 nm, more preferably 380 to 650 nm, and further preferably 440 to 580 nm.

Hereinafter, an exemplary specific configuration of the first substrate 21, and a method for producing the same, are described, with reference to FIGS. 11A to 11O. The second substrate 22 may have a configuration identical to that of the first substrate 21, and may be produced in the same manner as that for the first substrate 21.

Figure 11A:
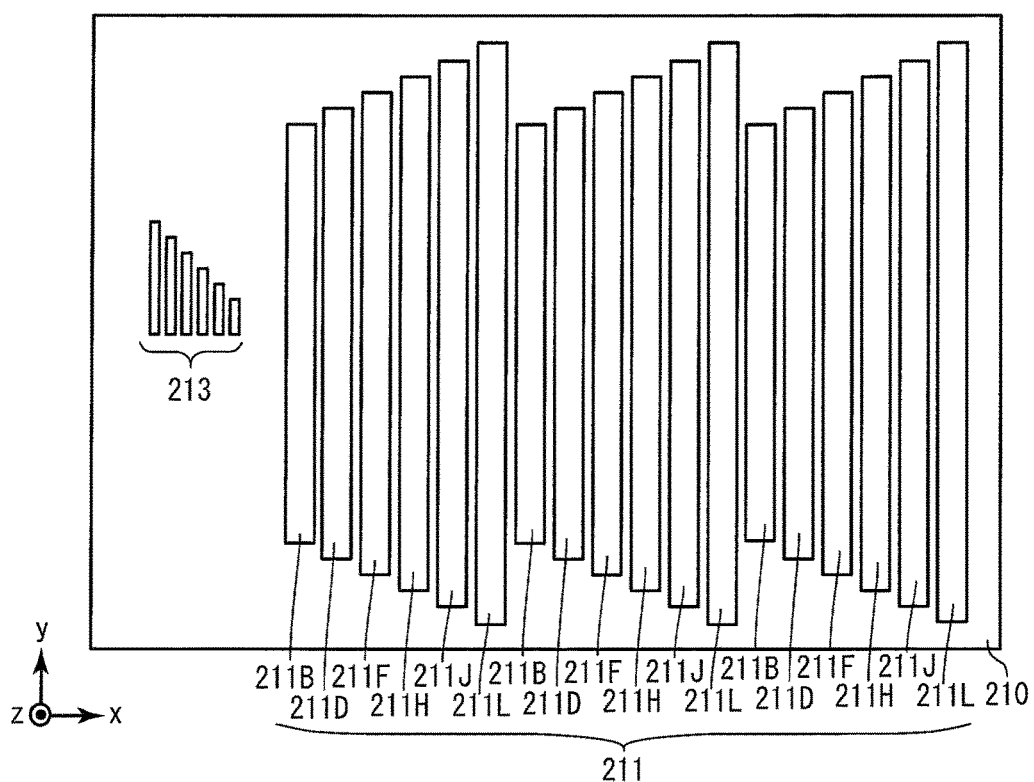
FIG. 11A is a view for explaining an exemplary method for producing the first substrate.

First of all, as illustrated in FIG. 11A, the first electrode group 211 and relay electrodes 213 are formed on the substrate 210. The relay electrodes 213 are electrodes for relaying the line group 212 that is to be formed in a later step. The substrate 210 is a substrate that has translucency and insulation properties, for example, a glass substrate. The first electrode group 211 preferably has translucency. In a case where the relay electrodes 213 are formed in the active area, the relay electrodes 213 preferably have translucency as well. On the other hand, in a case where the relay electrodes 213 are formed outside the active area, the relay electrodes 213 are not required to have translucency. The first electrode group 211 and the relay electrodes 213 are made of, for example, indium tin oxide (ITO). In the case where the relay electrodes 213 are formed outside the active area, the relay electrodes 213 may be made of, for example, aluminum. The first electrode group 211 and the relay electrodes 213 are formed by the following process, for example: films are formed by sputtering or chemical vapor deposition (CVD), and are patterned by photolithography.

Figure 11B:
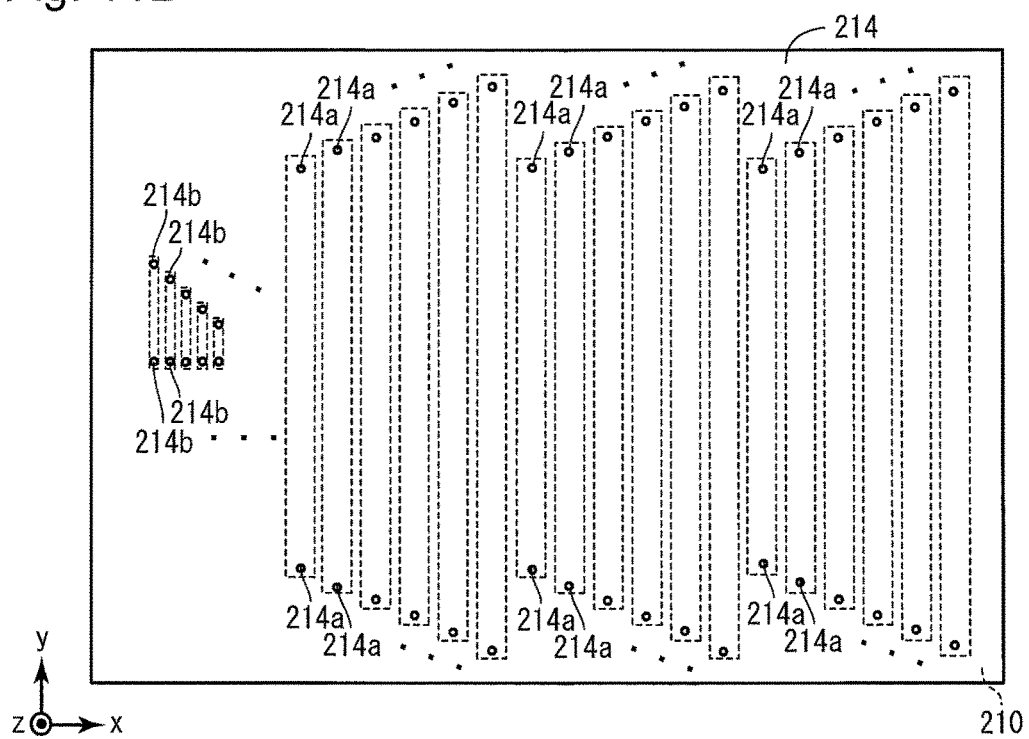
FIG. 11B is a view for explaining an exemplary method for producing the first substrate.

Next, as illustrated in FIG. 11B, an insulating film 214 is formed so as to cover the substrate 210, the first electrode group 211, and the relay electrodes 213. In the insulating film 214, contact holes 214a and contact holes 214b are formed. The contact holes 214a are formed at such positions as to allow the first electrode group 211 and the line group 212, which is to be formed in the next step, to be connected with each other. The contact holes 214b are formed at such positions as to allow the relay electrodes 213 and the line group 212 to be connected with each other.

The insulating film 214 preferably has translucency, and is made of, for example, SiN. The insulating film 214, for example, is formed with a film formed by CVD, and the contact holes 214a and the contact holes 214b are formed therein by photolithography. In a case where the line group 212 is formed outside the active area, the patterning may be performed in such a manner that the insulating film 214 is formed only outside the active area.

Figure 11C:
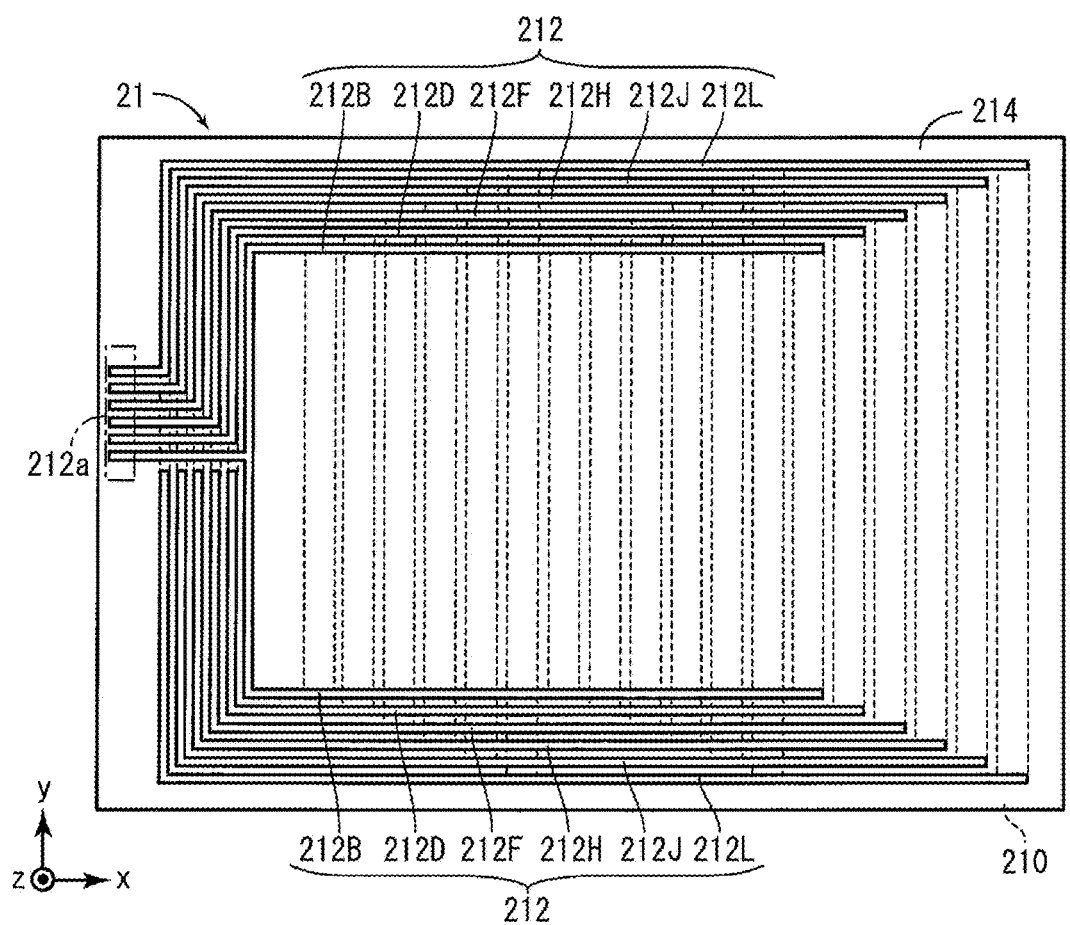
FIG. 11C is a view for explaining an exemplary method for producing the first substrate.

Next, as illustrated in FIG. 11C, the line group 212 is formed. The line group 212 is connected via the contact holes 214a to the first electrode group 211, and is connected via the contact holes 214b to the relay electrodes 213. The line group 212 preferably has high conductivity, and is made of, for example, aluminum. The line group 212 may be made of ITO. The line group 212 is formed by the following process, for example: a film is formed by sputtering, and is patterned by photolithography.

As described above, the electrodes 211B, 211D, 211F, 211H, 211J, and 211L are connected with the lines 212B, 212D, 212F, 212H, 212J, and 212L, respectively. With this three-layer configuration of the first electrode group 211, the insulating layer 214, and the line group 212, the first electrode group 211 and the line group 212 are caused to intersect as viewed in a plan view.

In the example illustrated in FIG. 11C, ends on one side of the line group 212 are gathered in the vicinities of a peripheral part of the substrate 21, and form a terminal part 212a. To the terminal part 212a, a flexible printed circuit (FPC) and the like is connected.

In the example illustrated in FIG. 11C, lines are connected to ends on both sides in the y direction of each electrode of the electrode group 211. The pair of lines connected to ends on both sides in the y direction of each electrode of the electrode group 211 are connected with each other by the relay electrodes 213. By applying a signal from both ends in the y direction of each electrode of the electrode group 211, a potential difference in the inside of each electrode can be reduced.

[Method for Driving Switch Liquid Crystal Panel 20]

Figure 12:
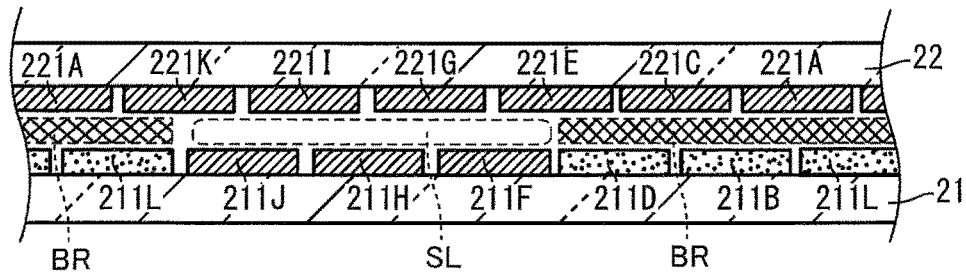
FIG. 12 is a cross-sectional view schematically illustrating a barrier lighting state of the switch liquid crystal panel.
Figure 13A:
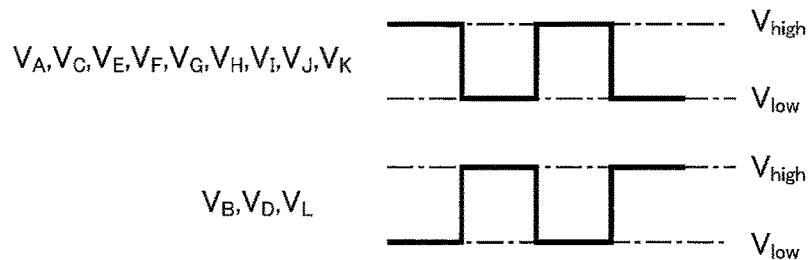
FIG. 13A illustrates exemplary waveforms of signals $V_A$ to $V_L$ supplied to respective electrodes so as to turn the switch liquid crystal panel into the barrier lighting state illustrated in FIG. 12.

FIG. 12 is a cross-sectional view schematically illustrating one barrier lighting state of the switch liquid crystal panel 20. FIG. 13A illustrates exemplary waveforms of signals $V_A$ to $V_L$ supplied to respective electrodes so as to turn the switch liquid crystal panel 20 into the barrier lighting state illustrated in FIG. 12.

The control unit 40 drives a part of electrodes included in one electrode group selected from the first electrode group 211 and the second electrode group 221, with a first phase, and drives the other electrodes with a second phase having a polarity opposite to that of the first phase. In FIG. 12, the electrodes driven with the first phase are schematically indicated with a sandy pattern. This applies to FIGS. 14, 16A, and 16B to be described below.

In an example illustrated in FIG. 13A, the control unit 40 applies a rectangular alternating-current voltage, whose first phase is applied to the electrodes 211B, 211D, and 211L included in the first electrode group 211, and whose second phase is applied to the other electrodes (the electrodes 211F, 211H, 211J and the electrodes 221A to 221K).

As illustrated in FIG. 13A, however, the amplitudes of the signals $V_A$ to $V_L$ are preferably equal. In the example illustrated in FIG. 13A, the signals $V_A$ to $V_L$ have either the predetermined high-level potential ($V_{high}$, for example, 5 V) or the predetermined low-level potential ($V_{low}$, for example, 0V).

This allows a potential difference of $|V_{high}-V_{low}|$ to occur between the electrode 221A and the electrode 211B, thereby causing the liquid crystal molecules of the liquid crystal layer 23 between the electrode 221A and the electrode 211B to be aligned in the z direction. The switch liquid crystal panel 20 is normally white liquid crystal. Therefore, the barrier BR is formed in a portion where the electrode 221A and the electrode 211B overlap as viewed in a plan view (the xy plan view).

Similarly, the barriers BR are formed in portions where the electrode 211B and the electrode 221C overlap, the electrode 221C and the electrode 211D overlap, the electrode 211D and the electrode 221E overlap, the electrode 221K and the electrode 211L overlap, and the electrode 211L and the electrode 221A overlap, when viewed in the plan view.

On the other hand, no potential difference occurs to between the electrode 221E and the electrode 211F. As described above, the switch liquid crystal panel 20 is normally white liquid crystal. Therefore, the slit SL is formed in a portion where the electrode 221E and the electrode 211F overlap when viewed in the plan view.

Similarly, the slits SL are formed in portions where the electrode 211F and the electrode 221G overlap, the electrode 221G and the electrode 211H overlap, the electrode 211H and the electrode 221I overlap, the electrode 221I and the electrode 211J overlap, as well as the electrode 211J and the electrode 221K overlap, as viewed in a plan view.

As a result, the barrier BR is formed in a portion that overlaps the electrodes 211B, 211D, and 211L driven with the first phase, as viewed in a plan view, and the slit SL is formed in a portion that overlaps the electrodes 211F, 211H, and 211J as viewed in a plan view.

Figure 13B:
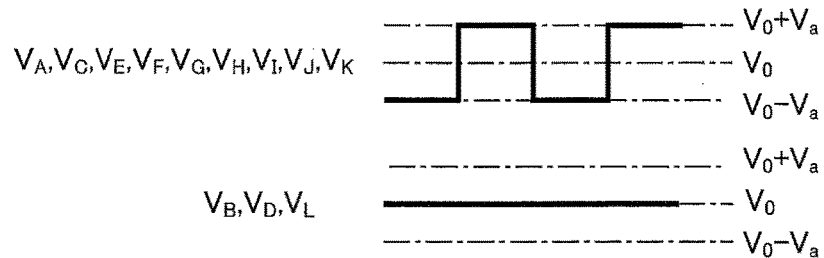
FIG. 13B illustrates other exemplary waveforms of the signals $V_A$ to $V_L$ supplied to the electrodes so as to turn the switch liquid crystal panel into the barrier lighting state illustrated in FIG. 12.

FIG. 13B illustrates other exemplary waveforms of the signals $V_A$ to $V_L$ supplied to the electrodes so as to turn the switch liquid crystal panel 20 into the barrier lighting state illustrated in FIG. 12.

In the example illustrated in FIG. 13B, the control unit 40 sets the electrodes 211B, 211D, and 211L included in the first electrode group 211 to a constant potential $V_O$ (for example, GND), and applies a rectangular alternating-current voltage that alternates with a half amplitude of $V_a$ (for example, $V_a$=5 V) with respect to a potential of $V_O$ as the center, to the other electrodes (the electrodes 211F, 211H, and 211J, as well as the electrodes 221A to 221K).

This causes a potential difference of $|V_a|$ to occur in the portion overlapping the electrodes 211B, 211D, and 211L as viewed in a plan view, thereby causing a barrier BR to be formed therein. On the other hand, no potential difference occurs in the portion overlapping the electrodes 211F, 211H, and 211J, as viewed in a plan view, thereby causing a slit SL to be formed therein.

Figure 13C:
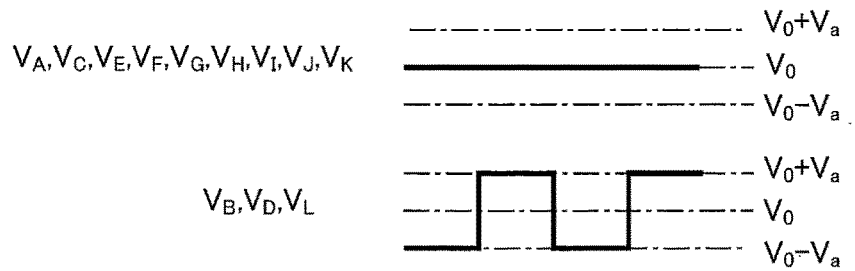
FIG. 13C illustrates still other exemplary waveforms of the signals $V_A$ to $V_L$ supplied to the electrodes so as to turn the switch liquid crystal panel into the barrier lighting state illustrated in FIG. 12.

FIG. 13C shows still other exemplary waveforms of the signals $V_A$ to $V_L$ supplied to the electrodes so as to turn the switch liquid crystal panel 20 into the barrier lighting state illustrated in FIG. 12.

In the example illustrated in FIG. 13C, the control unit 40 applies a rectangular alternating-current voltage that alternates with a half amplitude of $V_a$ (for example, $V_a$=5 V) with respect to a potential of $V_O$ as the center, to the electrodes 211B, 211D, and 211L included in the first electrode group 211, and sets the other electrodes (the electrodes 211F, 211H, and 211J, as well as the electrodes 221A to 221K) to a constant potential $V_O$ (for example, GND).

This causes a potential difference of $|V_a|$ to occur in the portion overlapping the electrodes 211B, 211D, and 211L as viewed in a plan view, thereby causing a barrier BR to be formed therein. On the other hand, no potential difference occurs in the portion overlapping the electrodes 211F, 211H, and 211J as viewed in a plan view, thereby causing a slit SL to be formed therein.

Figure 14:
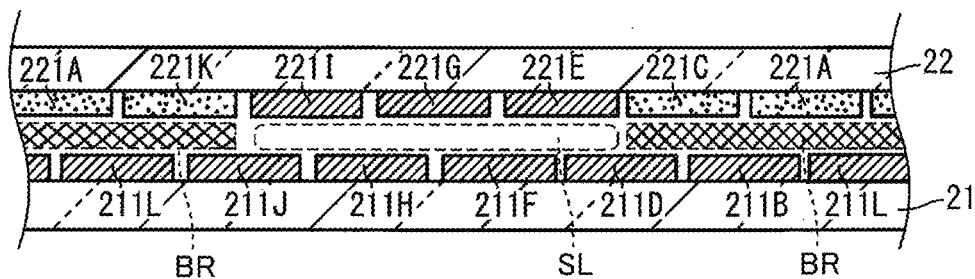
FIG. 14 is a cross-sectional view schematically illustrating another barrier lighting state of the switch liquid crystal panel.
Figure 15A:
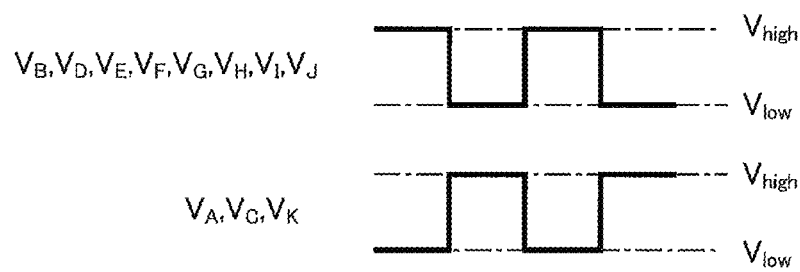
FIG. 15A illustrates exemplary waveforms of signals $V_A$ to $V_L$ supplied to respective electrodes so as to turn the switch liquid crystal panel into the barrier lighting state illustrated in FIG. 14.
Figure 15B:
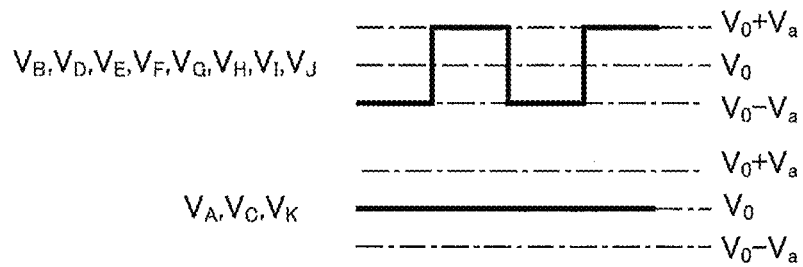
FIG. 15B illustrates other exemplary waveforms of the signals $V_A$ to $V_L$ supplied to the electrodes so as to turn the switch liquid crystal panel into the barrier lighting state illustrated in FIG. 14.
Figure 15C:
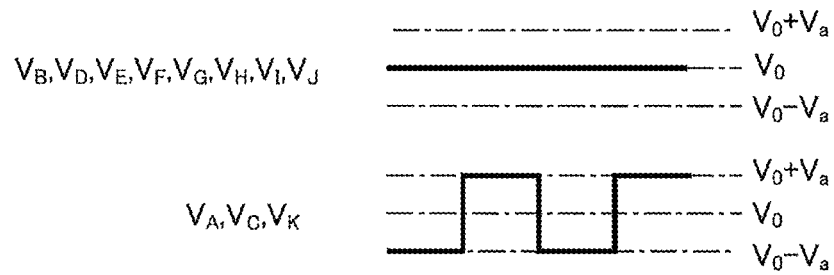
FIG. 15C illustrates still other exemplary waveforms of the signals $V_A$ to $V_L$ supplied to the electrodes so as to turn the switch liquid crystal panel into the barrier lighting state illustrated in FIG. 14.

FIG. 14 is a cross-sectional view schematically illustrating another barrier lighting state of the switch liquid crystal panel 20. FIGS. 15A to 15C show exemplary waveforms of signals $V_A$ to $V_L$ supplied to the respective electrodes so as to turn the switch liquid crystal panel 20 into the barrier lighting state illustrated in FIG. 14. Descriptions about FIGS. 15A to 15C, which are identical to those about FIG. 13A to FIG. 13C, are omitted here.

As is clear from comparison between FIG. 12 and FIG. 14, with this configuration of the switch liquid crystal panel 20, the barrier lighting state can be controlled using half of the electrode interval BP as a minimum unit.

Here, even when the retardation $\Delta n \cdot d$ is the same, properties of the switch liquid crystal panel 20 vary depending on the refractive index anisotropy $\Delta n$. More specifically, as $\Delta n$ is smaller, the crosstalk can be reduced.

Figure 16A:
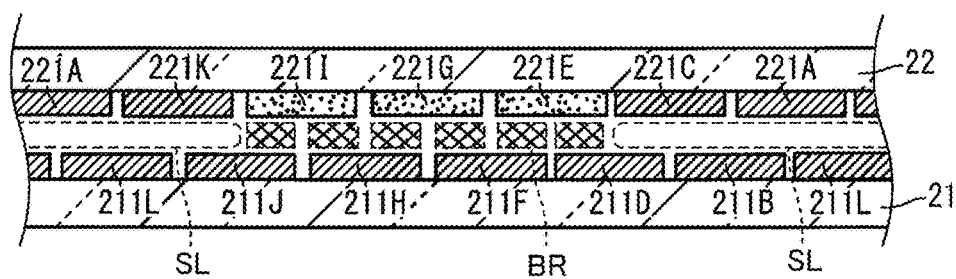
FIG. 16A is a cross-sectional view schematically illustrating one barrier lighting state of the switch liquid crystal panel when the liquid crystal molecules have a large refractive index anisotropy Δn.

FIG. 16A is a cross-sectional view schematically illustrating one barrier lighting state of the switch liquid crystal panel 20 when the liquid crystal molecules have a large refractive index anisotropy $\Delta n$. In FIG. 16A, the electrodes 221E, 221G, and 221I are driven with the first phase. This causes an electric field parallel to the z direction to be formed in a portion that overlaps the electrodes 221E, 221G, and 221I as viewed in a plan view.

Here, no electrode is present between the electrodes 211D and 211F, between the electrodes 221E and 221G, between the electrodes 211F and 211H, between the electrodes 221G and 221I, and between the electrodes 211H and 211J. In portions where no electrode is present (inter-electrode areas), therefore, the electric field is not parallel with the z direction, thereby having in-plane direction components. This causes alignment of the liquid crystal molecules to be disturbed. The disturbance of the alignment is maximized at the substrate interface of the liquid crystal layer, and as the proximity to internal portions of the liquid crystal layer increases, the alignment becomes closer to the normal alignment identical to that above the electrodes. In a case where the refractive index anisotropy $\Delta n$ is large, the residual retardation $\Delta n \cdot d$ due to the liquid crystal molecules in the vicinities of the substrate interface, which are not normally aligned, becomes relatively large. This makes it impossible to obtain sufficient light shielding properties in a part of the barrier areas, and a part of a left eye image goes into the right eye, or a part of a right eye image goes into the left eye, in some cases. In other words, light leaks out through the inter-electrode areas, which results in degradation of crosstalk.

In a case of a liquid crystal display device, the inter-electrode areas are shielded by a black matrix, and hence, the disturbance of alignment of the liquid crystal molecule in the inter-electrode areas does not matter. On the other hand, in the case of the switch liquid crystal panel 20, since the black matrix cannot be arranged between the electrodes, to improve the light shielding properties of the inter-electrode areas is required.

Figure 16B:
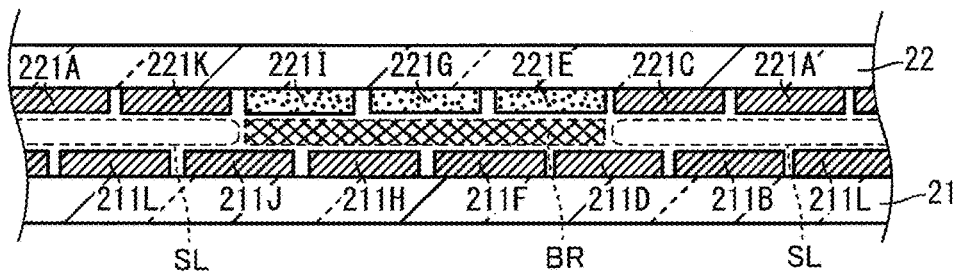
FIG. 16B is a cross-sectional view schematically illustrating one barrier lighting state of the switch liquid crystal panel when the liquid crystal molecules have a small refractive index anisotropy Δn.

FIG. 16B is a cross-sectional view schematically illustrating one barrier lighting state of the switch liquid crystal panel 20 in a case where the liquid crystal molecules have a small refractive index anisotropy $\Delta n$. In the case where the liquid crystal molecules have a small refractive index anisotropy $\Delta n$, the residual retardation $\Delta n \cdot d$ due to the liquid crystal molecules in the vicinities of the substrate interface, which are not normally aligned, becomes relatively small. This prevents light shielding properties in the barrier areas from deteriorating. Preferably $\Delta n$ is 0.14 or less.

Figure 16C:
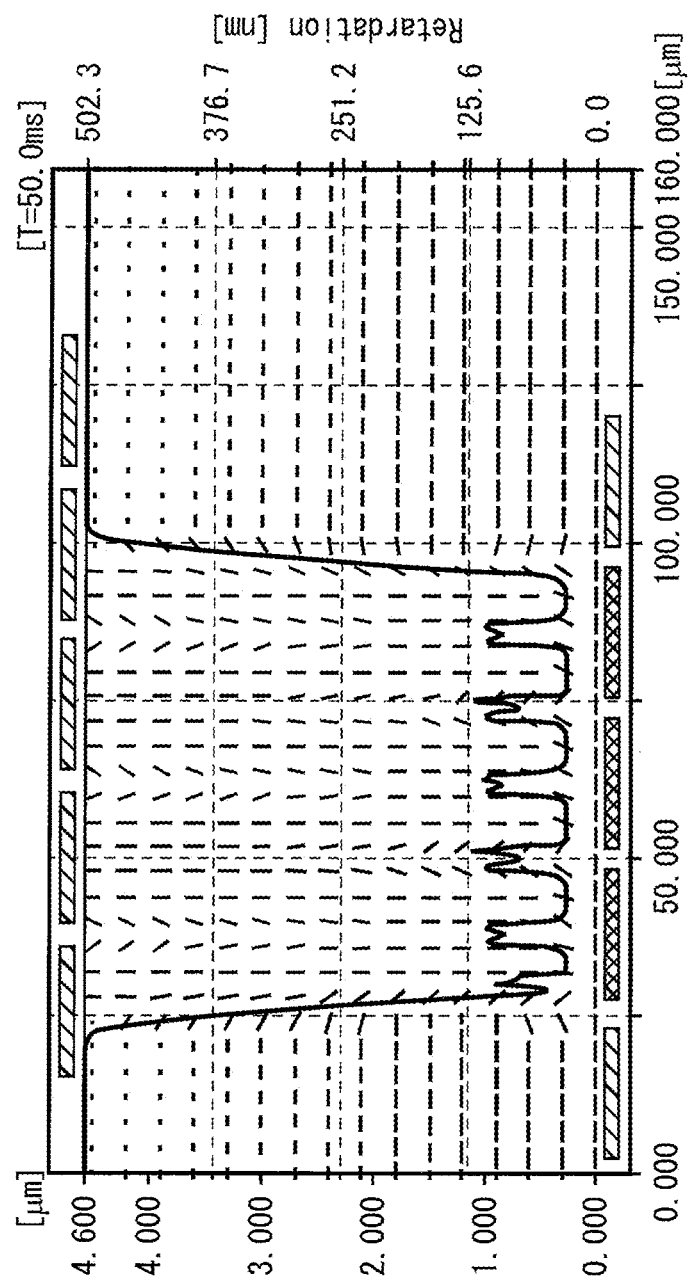
FIG. 16C is a graph showing simulation of alignment of the liquid crystal molecules and distribution of values of retardation Δn·d.

FIG. 16C is a graph showing simulation of alignment of the liquid crystal molecules and distribution of values of retardation Δn·d (right axis) when the following is assumed: the refractive index anisotropy Δn=0.11; the cell thickness d=4.6 m; and the barrier pitch BP=25 μm. As shown in FIG. 16C, the retardation Δn·d in the inter-electrode area is about 90 nm. With reference to FIG. 9, the transmittance is 10% or less when the retardation Δn·d is about 90 nm, which proves that relatively good light shielding properties can be obtained even in the inter-electrode area.

The foregoing description describes the stereoscopic display device 1 according to Embodiment 1 of the present invention. In the foregoing description, an exemplary configuration in which the first electrode group 211 is composed of six types of electrodes is described. This configuration is an example, and the number of electrodes composing the first electrode group 211 is arbitrary.

Embodiment 2

Figure 17:
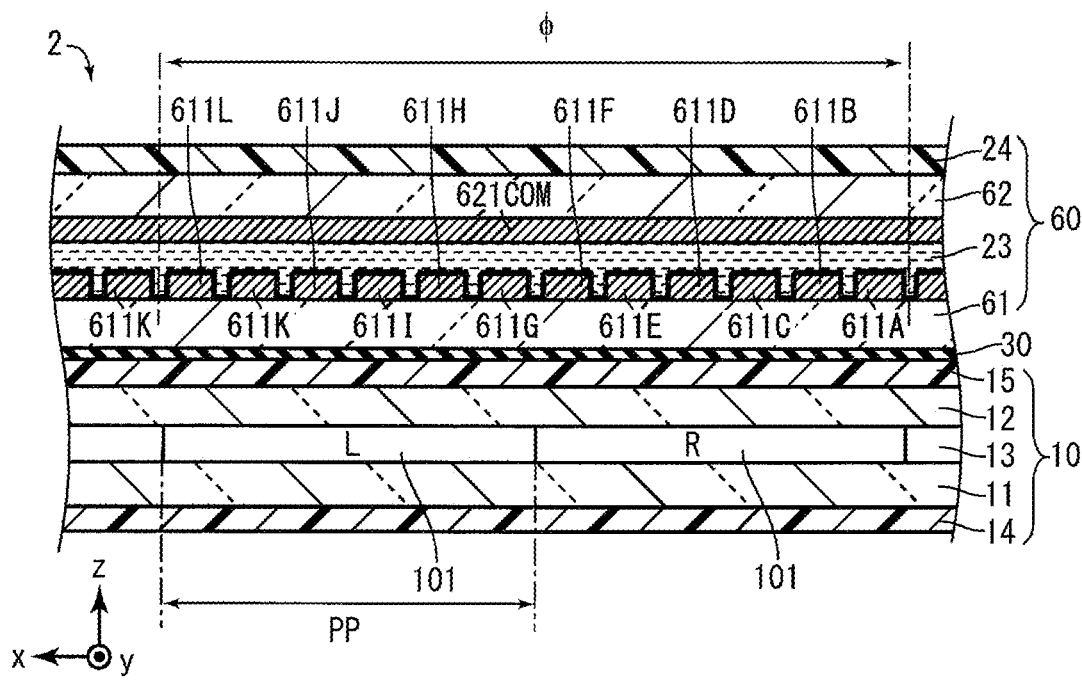
FIG. 17 is a cross-sectional view illustrating a schematic configuration of a stereoscopic display device according to Embodiment 2 of the present invention.

FIG. 17 is a cross-sectional view illustrating a schematic configuration of a stereoscopic display device 2 according to Embodiment 2 of the present invention. The stereoscopic display device 2 includes a switch liquid crystal panel 60 in place of the switch liquid crystal panel 20.

The switch liquid crystal panel 60 includes a first substrate 61 in place of the first substrate 21 of the switch liquid crystal panel 20, and a second substrate 62 in place of the second substrate 22.

On the first substrate 61, electrodes 611A to 611L to which signals of twelve systems, i.e., signals $V_A$ to $V_L$, are supplied are formed. The electrodes 611A to 611L are formed in a periodic fashion in the x direction, as is the case with the electrodes 211B to 211K on the first substrate 21.

On the second substrate 62, a common electrode 621COM is formed so as to cover a substantially entire surface of the active area of the second substrate 62. To the common electrode 621COM, a signal $V_{COM}$ is supplied.

Figure 18:
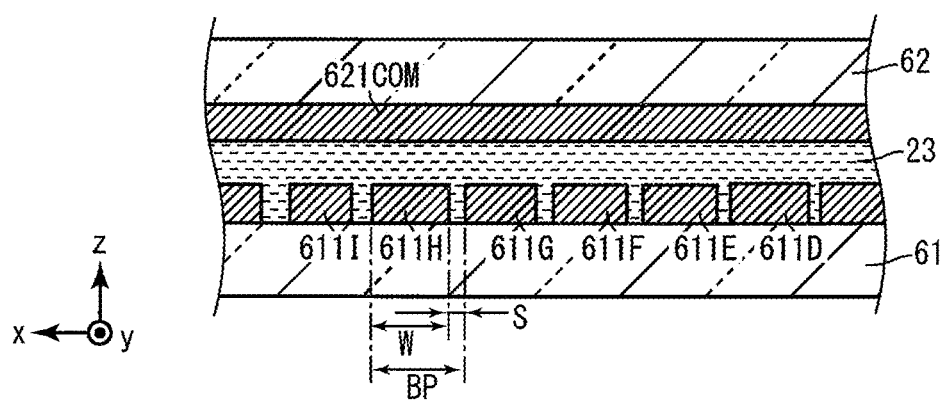
FIG. 18 is an enlarged cross-sectional view of a part of a switch liquid crystal panel.

FIG. 18 is an enlarged cross-sectional view of a part of the switch liquid crystal panel 60. In the present embodiment, the configuration is such that BP=φ/12≈PP/6 is satisfied.

The switch liquid crystal panel 60 is twisted nematic liquid crystal, and is normally white liquid crystal, as is the case with the switch liquid crystal panel 20.

[Method for Driving Switch Liquid Crystal Panel 60]

Next, the following description describes a method for driving the switch liquid crystal panel 60 while referring to FIGS. 19 and 20A to 20C.

Figure 19:
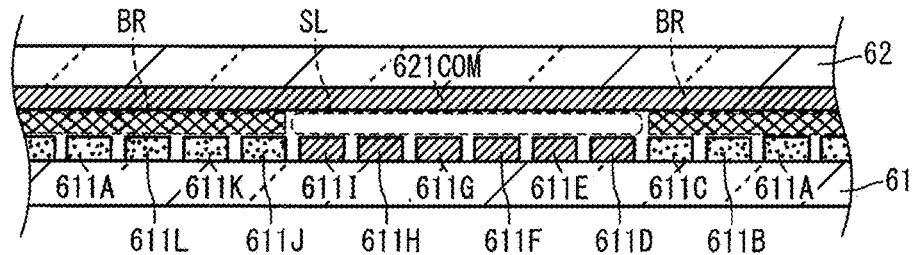
FIG. 19 is a cross-sectional view schematically illustrating another barrier lighting state of the switch liquid crystal panel.
Figure 20A:
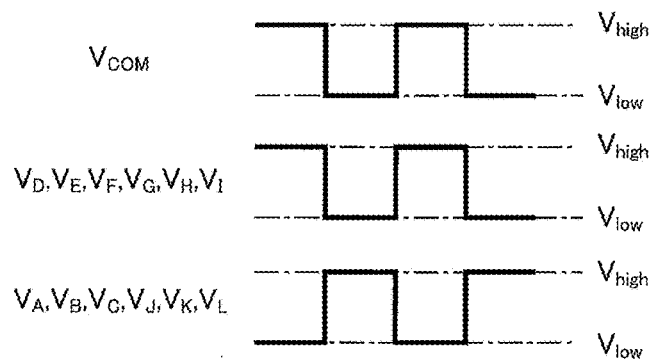
FIG. 20A illustrates exemplary waveforms of signals $V_{COM}$ and $V_A$ to $V_L$ supplied to respective electrodes so as to turn the switch liquid crystal panel into the barrier lighting state illustrated in FIG. 19.

FIG. 19 is a cross-sectional view schematically illustrating one barrier lighting state of the switch liquid crystal panel 60. FIG. 20A illustrates exemplary waveforms of signals $V_{COM}$ and $V_A$ to $V_L$ supplied to respective electrodes so as to turn the switch liquid crystal panel 60 into the barrier lighting state illustrated in FIG. 19.

The control unit 40 drives the common electrode 621COM and the electrodes 611D to 611I with the same phase, and drives the other electrodes with a phase having an opposite polarity. In FIG. 9, the electrodes driven with the phase having the polarity opposite to that for the common electrode 621COM are schematically indicated with a sandy pattern. This applies to FIGS. 21A and 21B to be described below.

In the example shown in FIG. 20A, the control unit 40 applies rectangular alternating-current voltages having opposite polarities to the common electrode 621COM and the electrodes 611D to 611I on one hand, and to the other electrodes on the other hand, respectively.

As illustrated in FIG. 20A, the signals $V_{COM}$ and $V_A$ to $V_L$ preferably have equal amplitudes. In the example illustrated in FIG. 20A, the signals $V_{COM}$ and $V_A$ to $V_L$ have either the predetermined high-level potential ($V_{high}$, for example, 5 V) or the predetermined low-level potential ($V_{low}$, for example, 0V).

This allows a potential difference of $|V_{high}-V_{low}|$ to occur between the common electrode 621COM and the electrode 611A, thereby causing liquid crystal molecules of the liquid crystal layer 23 between the common electrode 621COM and the electrode 611A to be aligned in the z direction. As described above, the switch liquid crystal panel 60 is normally white liquid crystal. Therefore, the barrier BR is formed in a portion where the common electrode 621COM and the electrode 611A overlap as viewed in a plan view (the xy plan view).

Similarly, the barriers BR are formed in portions where the common electrode 621COM and the electrode 611B overlap, the common electrode 621COM and the electrode 611C overlap, the common electrode 621COM and the electrode 611J overlap, the common electrode 621COM and the electrode 611K overlap, and the common electrode 621COM and the electrode 611L overlap, as viewed in a plan view.

On the other hand, no potential difference occurs between the common electrode 621COM and the electrodes 611D to 611I. As described above, the switch liquid crystal panel 20 is normally white liquid crystal. Therefore, a slit SL is formed in a portion where the common electrode 621COM and the electrodes 611D to 611I overlap as viewed in a plan view.

In this way, in this example, the slit SL is formed at a position that overlaps the electrodes driven with the same phase as that for the common electrode 621COM as viewed in a plan view, and the barrier BR is formed at a position that overlaps the other electrodes as viewed in a plan view.

Figure 20B:
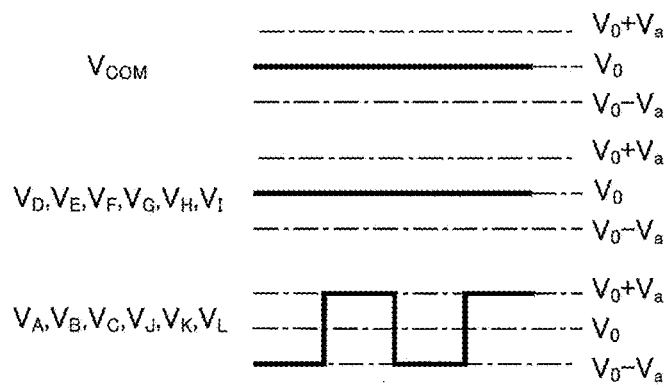
FIG. 20B illustrates other exemplary waveforms of the signals $V_{COM}$ and $V_A$ to $V_L$ supplied to the electrodes so as to turn the switch liquid crystal panel into the barrier lighting state illustrated in FIG. 19.

FIG. 20B shows other exemplary waveforms of the signals $V_{COM}$ and $V_A$ to $V_L$ supplied to the respective electrodes so as to turn the switch liquid crystal panel 60 into the barrier lighting state illustrated in FIG. 19.

In the example illustrated in FIG. 20B, the control unit 40 sets the common electrode 621COM and the electrodes 611D to 611I to a constant potential $V_0$ (for example, GND), and applies a rectangular alternating-current voltage that alternates with a half amplitude of $V_a$ (for example, $V_a$=5 V) with respect to a potential of $V_0$ as the center, to the electrodes 611A, 611B, 611C, 611J, 611K, and 611L.

This causes a potential difference of $|V_a|$ to occur in the portions overlapping the electrodes 611A, 611B, 611C, 611J, 611K, and 611L as viewed in a plan view, thereby causing the barriers BR to be formed therein. On the other hand, no potential difference occurs in the portions overlapping the electrodes 611D to 611I as viewed in a plan view, thereby causing the slits SL to be formed therein.

Figure 20C:
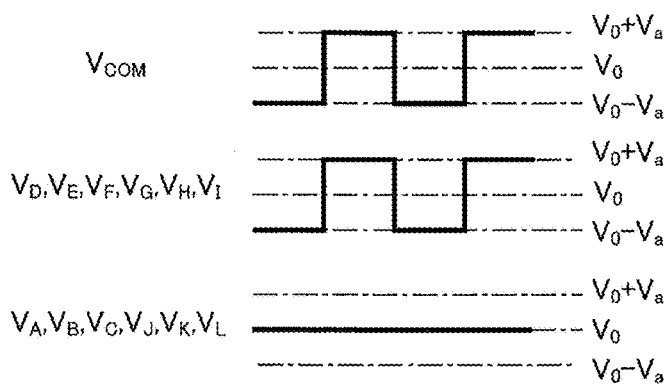
FIG. 20C illustrates still other exemplary waveforms of the signals $V_{COM}$ and $V_A$ to $V_L$ supplied to the electrodes so as to turn the switch liquid crystal panel into the barrier lighting state illustrated in FIG. 19.

FIG. 20C shows still other exemplary waveforms of the signals $V_{COM}$, $V_A$ to $V_L$ supplied to the electrodes so as to turn the switch liquid crystal panel 60 into the barrier lighting state illustrated in FIG. 19.

In the example illustrated in FIG. 20C, the control unit 40 applies a rectangular alternating-current voltage that alternates with a half amplitude of $V_a$ (for example, $V_a$=5 V) with respect to a potential of $V_0$ as the center, to the common electrode 621COM, and the electrodes 611D to 611I, and sets the electrodes 611A, 611B, 611C, 611J, 611K, and 611L to a constant potential $V_0$ (for example, GND).

This causes a potential difference of $|V_a|$ to occur in the portions overlapping the electrodes 611A, 611B, 611C, 611J, 611K, and 611L as viewed in a plan view, thereby causing the barriers BR to be formed therein. On the other hand, no potential difference occurs in the portion overlapping the electrodes 611D, 611F, and 611H as viewed in a plan view, thereby causing the slit SL to be formed therein.

As described above, according to the present embodiment, the barrier lighting state can be controlled by using the electrodes 611A to 611L as units. In other words, the barrier lighting state can be controlled by using the electrode interval BP as a minimum unit.

In the present embodiment as well, the properties of the switch liquid crystal panel 60 vary depending on the refractive index anisotropy Δn. More specifically, as Δn is smaller, the crosstalk can be reduced.

Figure 21A:
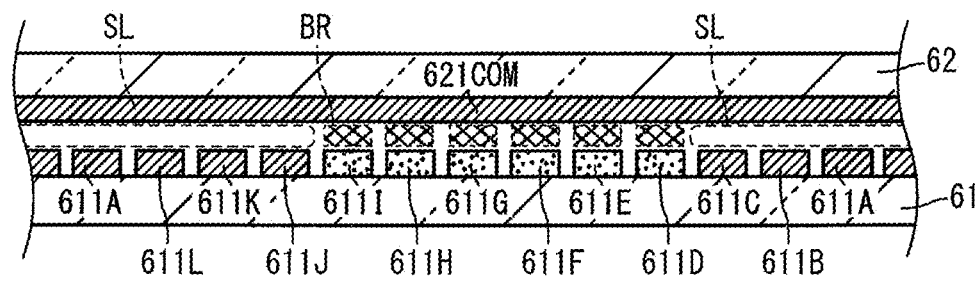
FIG. 21A is a cross-sectional view schematically illustrating one barrier lighting state of the switch liquid crystal panel when the liquid crystal molecules have a large refractive index anisotropy Δn.

FIG. 21A is a cross-sectional view schematically illustrating one barrier lighting state of the switch liquid crystal panel 60 when the liquid crystal molecules have a large refractive index anisotropy Δn. In FIG. 21A, a signal having a polarity opposite to that for the common electrode 621COM is applied to the electrodes 611D to 211I.

Here, no electrode is present between the electrodes 611D and 611E, between the electrodes 611E and 611F, between the electrodes 611F and 611G, between the electrodes 611G and 611H, and between the electrodes 611H and 611I. In the portions where no electrode is present (inter-electrode areas), the electric field is not parallel with the z direction, thereby having in-plane direction components. This causes alignment of the liquid crystal molecules to be disturbed. The disturbance of the alignment is maximized at the substrate interface of the liquid crystal layer, and as the proximity to internal portions of the liquid crystal layer increases, the alignment becomes closer to the normal alignment identical to that above the electrodes. In a case where the refractive index anisotropy Δn is large, the residual retardation Δn·d due to the liquid crystal molecules in the vicinities of the substrate interface, which are not normally aligned, becomes relatively large. This makes it impossible to obtain sufficient light shielding properties in a part of the barrier areas, which results in degradation of crosstalk.

Figure 21B:
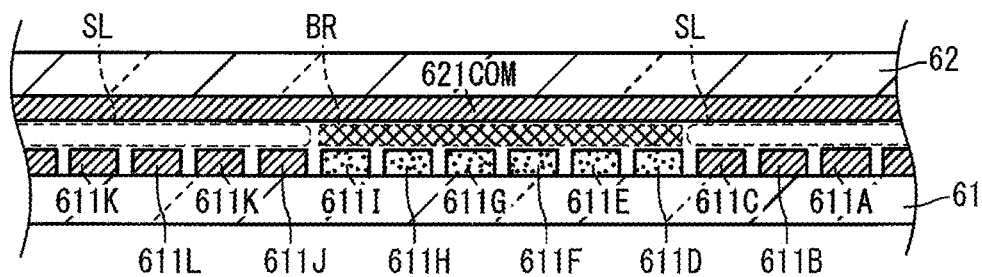
FIG. 21B is a cross-sectional view schematically illustrating one barrier lighting state of the switch liquid crystal panel in a case where the liquid crystal molecules have a small refractive index anisotropy Δn.

FIG. 21B is a cross-sectional view schematically illustrating one barrier lighting state of the switch liquid crystal panel 60 in a case where the liquid crystal molecules have a small refractive index anisotropy Δn. In the case where the liquid crystal molecules have a small refractive index anisotropy Δn, the residual retardation Δn·d due to the liquid crystal molecules in the vicinities of the substrate interface, which are not normally aligned, becomes relatively small. This prevents light shielding properties in the barrier areas from deteriorating. As is the case with Embodiment 1, Δn is preferably 0.14 or less.

The foregoing description describes Embodiment 2 of the present invention. In the foregoing description, an exemplary configuration in which twelve types of electrodes are formed on the first substrate 61 is described. This configuration is an example, and the number of electrodes formed on the first substrate 61 is arbitrary.

Configuration Example

The following description describes a more specific configuration example of a stereoscopic display device according to the present invention. This configuration example is not intended to limit the present invention.

First of all, in order to explain the effects of the configuration example described below, the crosstalk is quantitatively defined, using FIG. 22.

Figure 22:
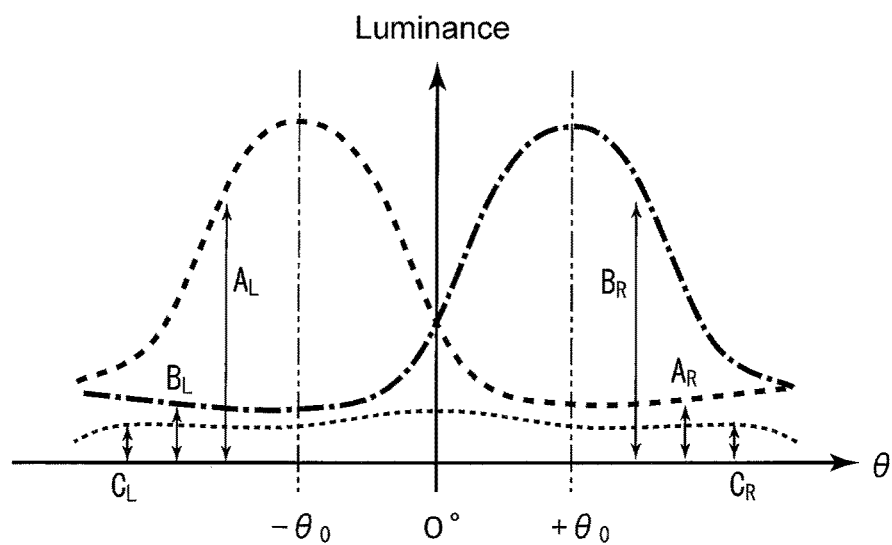
FIG. 22 illustrates angle characteristics of luminance of the stereoscopic display device when the barrier lighting state is fixed.

FIG. 22 illustrates angle characteristics of luminance of the stereoscopic display device when the barrier lighting state is fixed. Luminance $A_L$ is luminance observed at an angle θ of less than 0 (θ<0) when a black images is displayed as the right-eye image and a white image is displayed as the left-eye image. Luminance $A_R$ is luminance observed at an angle θ of more than 0 (θ>0) on the same screen. Luminance $B_L$ is luminance observed at an angle θ of less than 0 (θ<0) when a white image is displayed as the right-eye image, and a black image is displayed as the left-eye image. Luminance $B_R$ is luminance observed at an angle θ of more than 0 (θ>0) on the same screen. Luminance $C_L$ is luminance observed at an angle θ of less than 0 (θ<0) when black images are displayed as both of the right-eye image and the left-eye image. Luminance $C_R$ is luminance observed at an angle θ of more than 0 (θ>0) on the same screen.

Here, crosstalk XT(L) for the left eye is defined by the following expression:

$$XT(L)[\%] = \frac{B_L(\theta) - C_L(\theta)}{A_L(\theta) - C_L(\theta)} \times 100 \quad \text{[Formula 1]}$$

Similarly, crosstalk XT(R) for the right eye is defined by the following expression:

$$XT(R)[\%] = \frac{B_R(\theta) - C_R(\theta)}{A_R(\theta) - C_R(\theta)} \times 100 \quad \text{[Formula 2]}$$

Figure 23:
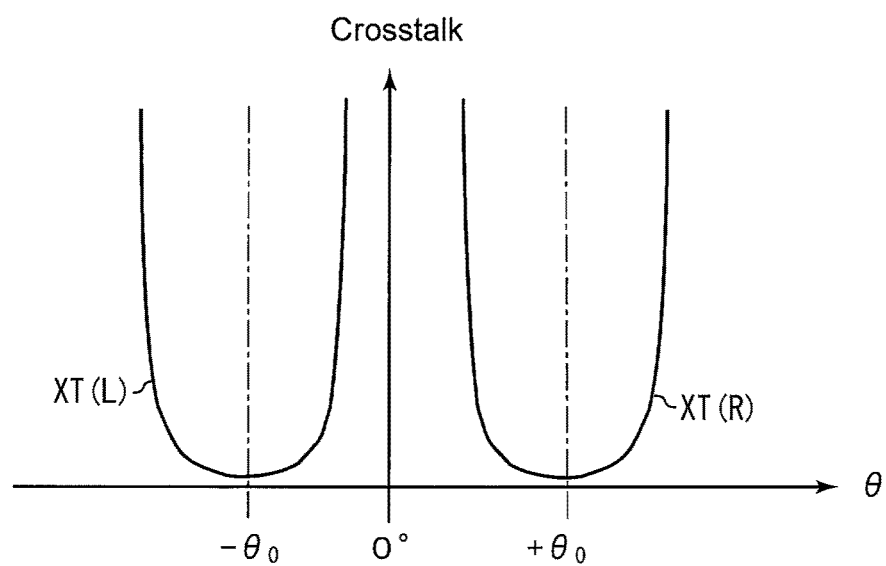
FIG. 23 illustrates angle characteristics of crosstalk XT(L) for the left eye and crosstalk XT(R) for the right eye.

FIG. 23 illustrates angle characteristics of crosstalk XT(L) for the left eye and crosstalk XT(R) for the right eye. The crosstalk XT(L) for the left eye has a minimum value at an angle $-\theta_0$, and increases as deviation from the angle $-\theta_0$ increases. Similarly, the crosstalk XT(R) for the right eye has a minimum value at an angle $+\theta_0$, and increases as deviation from the angle $+\theta_0$ increases. In the following, the minimum value of XT(R) and XT(L) is defined to be a crosstalk XT.

Configuration Example 1

Stereoscopic display devices according the configuration of the stereoscopic display device 1 according to Embodiment 1 (FIGS. 7 and 8) were produced. The electrode pitch PP was 53.7 μm, the barrier pitch BP was 17.89 μm, the electrode width W was 13.89 μm, and the clearance S between the electrodes was 4 μm. The pitch for the barrier movement BP/2 was 8.95 μm.

Under the 1st-min. setting (Δn·d≈510 nm), the refractive index anisotropy Δn and the cell thickness d were varied so that five types of stereoscopic display devices were produced, and respective values of the crosstalk XT (%) of the stereoscopic display devices were measured. The results are shown in FIG. 24.

Figure 25:
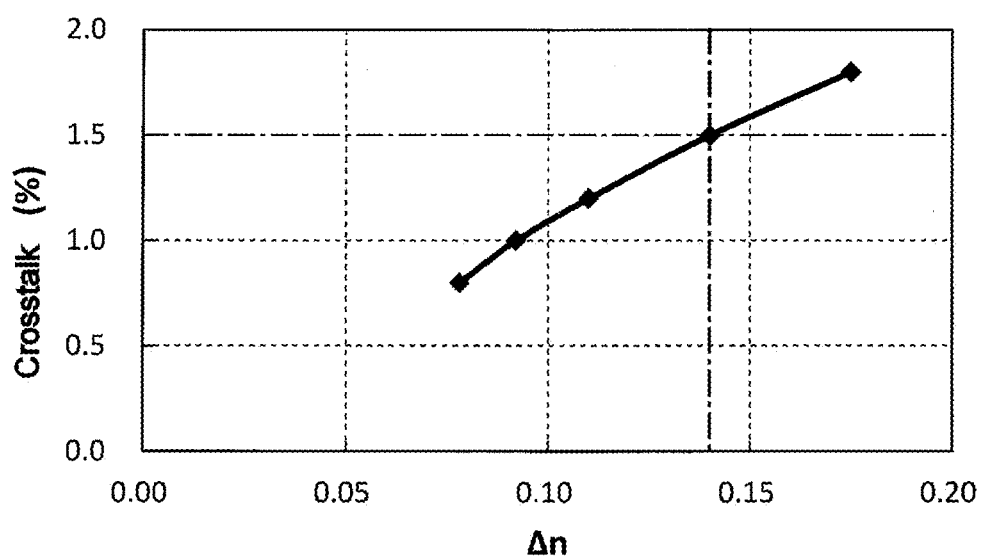
FIG. 25 is a graph illustrating the relationship between refractive index anisotropy Δn and crosstalk XT.

FIG. 25 is a graph illustrating the relationship between the refractive index anisotropy Δn and the crosstalk XT. As illustrated in FIG. 25, the following was recognized: the crosstalk XT depended on the refractive index anisotropy Δn, and there was a tendency that as the refractive index anisotropy Δn was smaller, the crosstalk XT was smaller.

To obtain excellent 3D quality, it is considered that one criterion is crosstalk XT of 1.5% or less. FIG. 25 indicates that when the refractive index anisotropy Δn is reduced to 0.14 or less, the crosstalk XT can be reduced to 1.5% or less.

Subsequently, in addition to the above-described stereoscopic display device, stereoscopic display devices having different retardations Δn·d were produced, and respective values of crosstalk XT and followability of these stereoscopic display devices were measured. The results are shown in FIG. 26.

The followability is an index regarding how stereoscopic display is actually viewed when the tracking is effected and the barrier is moved according to the position of the head of a viewer, and was evaluated by visually observing changes of the luminance and changes of crosstalk while a frame rate of a camera used as a position sensor was varied. In a case where no change in luminance and no change in crosstalk was observed when the frame rate of the camera was 60 fps, it was evaluated as "⊚" (excellent); in a case such a change was not observed when the frame rate was 60 to 120 fps, it was evaluated as "○" (good). In a case where a change in luminance or a change in crosstalk was slightly observed at 120 fps, it was evaluated as "Δ" (fair), and in a case where a significant change in luminance and crosstalk was observed even at 120 fps, it was evaluated as "x" (poor).

As illustrated in FIG. 26, the stereoscopic display device of No. 1 had good followability, but had crosstalk XT of greater than 1.5%. This is considered to be because the refractive index anisotropy Δn was high.

The stereoscopic display devices of No. 2 and No. 3 had crosstalk XT of 1.5% or smaller, and had good followability. Besides, since the 1st-min. setting was satisfied, the transmittance in the two-dimensional display mode was high.

The stereoscopic display device of No. 4 had slightly poor followability, though having low crosstalk XT. It can be considered that this is because of the slightly large cell thickness d.

The stereoscopic display device of No. 5 had poor followability, though having low crosstalk XT. It can be considered that this is because of the large cell thickness d.

The stereoscopic display device of No. 6 had crosstalk XT of 1.5% or less, and had good followability. The 1st-min. setting, however, was not satisfied, and hence, the transmittance in the two-dimensional display mode was low.

Configuration Example 2

Stereoscopic display devices according to the configuration of the stereoscopic display device 2 according to Embodiment 2 (FIGS. 17, 18) were produced. The electrode pitch PP was 53.7 μm, the barrier pitch BP was 8.95 μm, the electrode width W was 4.95 μm, and the clearance S between the electrodes was 4 μm. The pitch for barrier movement BP was 8.95 μm.

As is the case with the configuration example 1, under the 1st-min. setting (Δn·d≈510 nm), the refractive index anisotropy Δn and the cell thickness d were varied so that five types of stereoscopic display devices were produced, and respective values of the crosstalk XT (%) of the stereoscopic display devices were measured. The results are shown in FIG. 27.

As illustrated in FIG. 27, the following was recognized: in the case of this configuration example as well, there was a tendency that as the refractive index anisotropy Δn was smaller, the crosstalk XT was smaller.

Other Embodiments

The foregoing description describes embodiments of the present invention, but the present invention is not limited to the embodiments described above, and may be varied in many ways within the scope of the invention. Further, the embodiments can be carried out in combination appropriately.

In the descriptions of the embodiments mentioned above, an example is described in which the display panel 10 and the switch liquid crystal panel 20 are stacked so that the switch liquid crystal panel 20 is positioned on the viewer 90 side. The display panel 10 and the switch liquid crystal panel 20, however, may be stacked so that the display panel 10 is positioned on the viewer 90 side. This also applies to the switch liquid crystal panel 60.

In the configuration in which the display panel 10 is arranged on the viewer side, light separated by the switch liquid crystal panel 20 passes through the display panel 10. In this configuration, light separated by the switch liquid crystal panel 20 is scattered or diffracted by the display panel 10. This causes the crosstalk to deteriorate as compared with a configuration in which the switch liquid crystal panel 20 is arranged on the viewer 90 side with respect to the display panel 10, but causes the angle-dependent variation of the luminance to be more gradual. On the other hand, in a configuration in which the switch liquid crystal panel 20 is arranged on the viewer side, light from the display panel 10 is separated by the switch liquid crystal panel 20. This configuration exhibits excellent separation properties, as compared with the case where the display panel 10 is arranged on the viewer side.

In the embodiments mentioned above, examples are described in which a liquid crystal display panel is used as the display panel 10. However, an organic EL (electroluminescence) panel, a MEMS (micro electric mechanical system) panel, or a plasma display panel may be used in the place of the liquid crystal display panel.

INDUSTRIAL APPLICABILITY

The present invention is industrially applicable as a stereoscopic display device.

The invention claimed is:
1. A stereoscopic display device comprising:
a display panel that displays an image;
a switch liquid crystal panel that is arranged so as to be stacked on the display panel;
a position sensor that acquires position information of a viewer; and
control circuitry that moves a parallax barrier in which transmitting regions and non-transmitting regions are defined in periodic fashion in a predetermined alignment direction, in such a manner that the parallax barrier is moved in the predetermined alignment direction in accordance with the position information, and causes the switch liquid crystal panel to display the parallax barrier, wherein
the switch liquid crystal panel includes:
a liquid crystal layer in which refractive index anisotropy Δn of liquid crystal molecules is 0.14 or less;
a first substrate and a second substrate that face each other with the liquid crystal layer being interposed therebetween; and
an electrode group including a plurality of electrodes that are defined on at least one of the first substrate and the second substrate and are arranged in the alignment direction, and
when no voltage is applied to the liquid crystal layer, an alignment direction of liquid crystal molecules on a side of the first substrate, and an alignment direction of liquid crystal molecules on a side of the second substrate are 90° from each other.
2. The stereoscopic display device according to claim 1, wherein the switch liquid crystal panel is normally white.

3. The stereoscopic display device according to claim 1, wherein retardation of the liquid crystal layer is set to a first minimum.

4. The stereoscopic display device according to claim 1, wherein the liquid crystal layer has a thickness of 5.5 μm or less.

5. The stereoscopic display device according to claim 1, wherein the electrode group includes:
   a first electrode group that includes a plurality of electrodes that are formed on the first substrate and are arranged in the alignment direction at predetermined intervals; and
   a second electrode group that includes a plurality of electrodes that are formed on the second substrate and are arranged in the alignment direction at the predetermined intervals, and
   the first electrode group and the second electrode group are arranged so as to be deviated with respect to each other by half of the predetermined interval in the alignment direction.

6. The stereoscopic display device according to claim 1, wherein the electrode group includes:
   a first electrode group that includes a plurality of electrode that are formed on the first substrate and arranged in the alignment direction at predetermined intervals; and
   a common electrode that is formed on an approximately entire surface of the second substrate.

7. The stereoscopic display device according to claim 1, wherein the switch liquid crystal panel is arranged on a viewer side with respect to the display panel.

8. The stereoscopic display device according to claim 1, wherein the display panel is arranged on a viewer side with respect to the switch liquid crystal panel.

9. The stereoscopic display device according to claim 1, wherein the display panel is a liquid crystal display panel.

10. The stereoscopic display device according to claim 1, wherein the control circuitry defines the non-transmitting regions by using a plurality of electrodes adjacent in the electrode group.

11. The stereoscopic display device according to claim 10, wherein the switch liquid crystal panel operates in a normally white mode.

* * * * *